(12) United States Patent
Rouveyre et al.

(10) Patent No.: US 11,655,551 B2
(45) Date of Patent: May 23, 2023

(54) ELECTROLYZER ASSEMBLY COMPRISING AN INSULATING LAYER

(71) Applicant: Dioxycle, Bordeaux (FR)

(72) Inventors: Luc Rouveyre, Cognin (FR); David Wakerley, Bordeaux (FR); Sarah Lamaison, Bordeaux (FR)

(73) Assignee: Dioxycle, Bordeaux (FR)

( * ) Notice: Subject to any disclaimer, the term of this patent is extended or adjusted under 35 U.S.C. 154(b) by 0 days.

(21) Appl. No.: 17/869,148

(22) Filed: Jul. 20, 2022

(65) Prior Publication Data

US 2023/0028509 A1 Jan. 26, 2023

Related U.S. Application Data

(60) Provisional application No. 63/223,986, filed on Jul. 21, 2021, provisional application No. 63/351,441, filed on Jun. 13, 2022.

(51) Int. Cl.
*C25B 9/77* (2021.01)
*C25B 9/60* (2021.01)
*C25B 9/75* (2021.01)
*C25B 11/036* (2021.01)

(52) U.S. Cl.
CPC .............. *C25B 9/77* (2021.01); *C25B 9/60* (2021.01); *C25B 9/75* (2021.01); *C25B 11/036* (2021.01)

(58) Field of Classification Search
None
See application file for complete search history.

(56) References Cited

U.S. PATENT DOCUMENTS

| 4,371,433 A * | 2/1983 | Balko | H01M 8/242 |
| | | | 429/453 |
| 4,533,455 A * | 8/1985 | Balko | H01M 8/242 |
| | | | 204/279 |
| 6,495,278 B1 | 12/2002 | Schmid et al. | |
| 6,773,841 B2 | 8/2004 | Rapaport et al. | |
| 6,833,207 B2 | 12/2004 | Joos et al. | |

(Continued)

FOREIGN PATENT DOCUMENTS

| CN | 101707254 B | 1/2012 |
| WO | 2005028709 A1 | 3/2005 |
| WO | 2011089516 A2 | 7/2011 |

OTHER PUBLICATIONS

Pragma Industries, "PRO-RD Fuel Cell Stacks", https://www.pragma-industries.com/hydrogen-fuel-cells/stacks/.

(Continued)

*Primary Examiner* — Harry D Wilkins, III
(74) *Attorney, Agent, or Firm* — Daylight Law, P.C.

(57) ABSTRACT

Methods and systems related to the field of electrolyzers are disclosed. An electrolyzer assembly is disclosed which includes a stack of cells, a plurality of polar plates in the stack of cells, a plurality of flow fields between the plurality of polar plates, a conduit fluidly connecting flow fields in the plurality of flow fields, an electrically conductive fluid in the conduit, a plurality of insulating layers arranged between a conductive surface of the plurality of flow fields and the conduit, and a plurality of openings in the plurality of insulating layers providing a plurality of fluid connections between the conduit and the plurality of flow fields.

22 Claims, 12 Drawing Sheets

(56) References Cited

U.S. PATENT DOCUMENTS

| | | | |
|---|---|---|---|
| 6,878,244 B2* | 4/2005 | Sioli | C25B 9/77 204/269 |
| 9,012,104 B2 | 4/2015 | Peled et al. | |
| 2002/0175072 A1* | 11/2002 | Sioli | C25B 9/77 204/267 |
| 2009/0035644 A1 | 2/2009 | Markoski et al. | |
| 2011/0089516 A1 | 4/2011 | Sekiguchi | |
| 2017/0125826 A1 | 5/2017 | Noponen et al. | |

OTHER PUBLICATIONS

Rajalakshmi, et al., "PEM Fuel Cell Stack Development—Grafoil Bipolar Materials—a Feasibility Study", Fuelcell2004-2505, Proceedings of Fuelcell 2004, The 2nd International Conference on Fuel Cell Science, Engineering and Technology, Jun. 14-16, 2004, Rochester, New York, USA. https://www.researchgate.net/publication/267497549_PEM_Fuel_Cell_Stack_Development_Grafoil_Bipolar_Materials_-_A_Feasibility_Study.

International search report and written opinion from PCT Application No. PCT/IB2022/056715 dated Jan. 13, 2023, 22 pages.

* cited by examiner

ELECTROLYZER ASSEMBLY COMPRISING AN INSULATING LAYER

CROSS REFERENCE TO RELATED APPLICATIONS

This application claims the benefit of U.S. Provisional Patent Application No. 63/223,986, filed on Jul. 21, 2021, and U.S. Provisional Patent Application No. 63/351,441, filed on Jun. 13, 2022, both of which are incorporated by reference herein in their entirety for all purposes.

BACKGROUND

Electrolyzers have gained significant interest over the last years, as they allow the production of valuable chemicals such as hydrogen ($H_2$), carbon monoxide (CO), ethylene, ethanol, methane, formic acid, oxalic acid, acetic acid, propane, propanol, ammonia, amino-acids, urea, carbon- and nitrogen-containing products through the conversion of water, carbon dioxide ($CO_2$), carbon monoxide (CO) and/or carbonate ions ($CO_3^{2-}$) or bicarbonate ions ($HCO^{3-}$), and or nitrogen-containing compounds such as but not limited to nitrous oxides and/or $N_2$.

Electrolyzers consist of multiple cells that are stacked onto each other. In a stack, each individual cell comprises an anode and a cathode, separated by a membrane to provide selective ion conductivity. Individual cells are physically supported on each side by conductive polar plates. Polar plates are configured to apply electric potential between the cathode and the anode to drive oxidation and reduction reactions of reactant fluids. Such reactant fluids are transported towards the anode and cathode through flow fields often supported by the polar plates. As the conversion of reactants into valuable molecules is driven by electrical power, it is desirable to increase the energy efficiency of the electrolyzers in order to reduce the power requirement.

SUMMARY

Methods and systems related to the field of electrolyzers are disclosed. Methods and systems are disclosed that relate to electrolyzers in which at least one fluid in the electrolyzer is electrically conductive. The fluid may be a liquid or a mixture containing liquid and gas. The circulating fluid may be an electrolyte, such as a catholyte or an anolyte, a coolant, or a combination of these. The fluids can be distributed to each individual cell in a stack through a shared manifold. In electrolyzers, the proximity of the polar plates, which are electrically conductive parts, combined with the use of the electrically conductive fluid, may lead to leakage currents, also known as shunt currents or parasitic currents. This is problematic for multiple reasons. For example, the leakage currents lead to energy losses due to the contacting of the required electrically conducting parts of the device and the electrically conducting fluid, thereby decreasing energy efficiency. Furthermore, the shunt currents can cause parasitic reactions, including corrosion and gas generation, which may lead to material degradation, the reduction of the electrolyzer lifetime, alterations to the performance of the electrolyzer, and safety hazards.

In specific embodiments of the invention, an electrolyzer assembly is provided which includes a stack of cells, a plurality of polar plates in the stack of cells, a plurality of flow fields between the plurality of polar plates, a conduit fluidly connecting flow fields in the plurality of flow fields, an electrically conductive fluid in the conduit, a plurality of insulating layers arranged between a plurality of conductive surfaces of the plurality of flow fields and the conduit, and a plurality of openings in the plurality of insulating layers providing a plurality of fluid connections between the conduit and the plurality of flow fields.

In specific embodiments of the invention, a kit of parts for an electrolyzer assembly is provided which includes a polar plate having at least one flow field positioned to be fluidly connected to a conduit when the electrolyzer assembly cell is in an electrolyzer assembly; and at least one insulating piece shaped to be arranged between a conductive surface of the at least one flow field and the conduit when the electrolyzer assembly cell is in the electrolyzer assembly.

In specific embodiments of the invention, an electrolyzer assembly cell is provided which includes a first active face of a first bipolar plate, a first flow field on the first active face, a cathodic input fluid in the first flow field, a cathode to perform a reduction reaction of a reactant of the cathodic input fluid, a second active face of a second bipolar plate, a second flow field on the second active face, an anodic input fluid in the second flow field, an anode to perform an oxidation reaction of a reactant of the anodic input fluid, a first set of at least two conduits fluidly connected to the first flow field and shaped to supply the cathodic input fluid to the first flow field, a second set of at least two conduits fluidly connected to the second flow field and shaped to supply the anodic input fluid to the second flow field, at least two insulating layers arranged between at least two conductive surfaces of the first flow field and the first set of at least two conduits, and at least two insulating layers arranged between at least two conductive surfaces of the second flow field and the second set of at least two conduits. At least one of the anodic input fluid and the cathodic input fluid is electrically conductive.

DETAILED DESCRIPTION

Figure 1A:
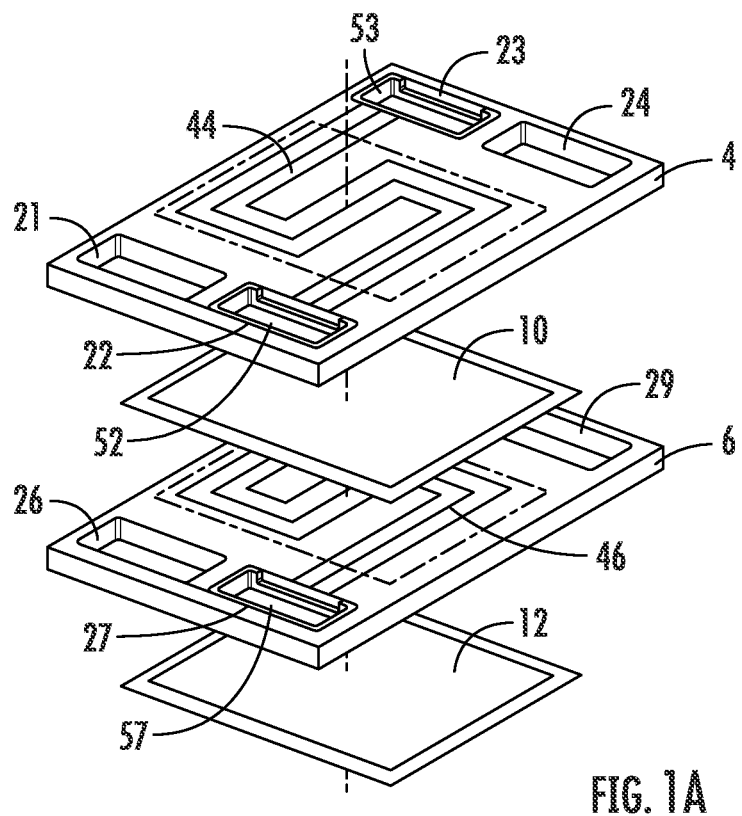
FIG. 1A illustrates an isometric exploded view of an electrolyzer in accordance with specific embodiments of the invention disclosed herein.

Methods and systems related to the field of electrolyzers in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Specific embodiments of the invention disclosed herein provide a solution to the problem of the leakage currents that often characterize electrolyzers, such as electrolyzers that use at least one electrically conductive fluid. The use of electrically conductive fluids, such as electrolytes and coolants, in proximity to electrolyzer conductive materials, can create an electrical contact between these materials, which leads to leakage currents. These leakage currents not only lead to energy losses, but they can also cause parasitic reactions, including corrosion and gas generation, which may lead to material degradation, the reduction of the electrolyzer lifetime, alterations in the performance of the electrolyzer, and cause safety hazards. Specific embodiments of the invention disclosed herein include electrolyzer assemblies and kits of parts that address these issues. In specific embodiments of the invention disclosed herein, electrolyzer assemblies and kits of parts include an insulating layer which effectively and sufficiently mitigates the impact of the aforementioned leakage currents by decreasing the conductivity of the electrical pathways which those leakage currents would otherwise utilize.

In specific embodiments of the invention, an electrolyzer assembly is provided. Such an electrolyzer assembly may be used for converting water, carbon dioxide ($CO_2$), carbon monoxide (CO), and/or carbonate ions ($CO_3^{2-}$) or bicarbonate ions ($HCO_3^{-}$) into valuable products. Carbon dioxide ($CO_2$), carbon monoxide (CO), carbonate, or bicarbonate ions are further referred herein to as $CO_x$. The electrolyzer assembly may be used for converting $CO_x$, for example, $CO_x$ contained in a fluid, into at least one valuable chemical. Such $CO_x$-containing fluid may also be co-reduced in the presence of N-containing species for the creation of carbon- and nitrogen-containing products such as but not limited to amino acids and/or urea and/or amide-containing organic species. As an example, the electrolyzer assembly could be used for converting $CO_2$ or CO into a desired product such as a carbon-based commodity, including, but not limited to, CO, alkanes, alcohols, and carboxylic acids. In the alternative or in combination, the electrolyzer assembly may be used for converting water into hydrogen ($H_2$).

Figure 1B:
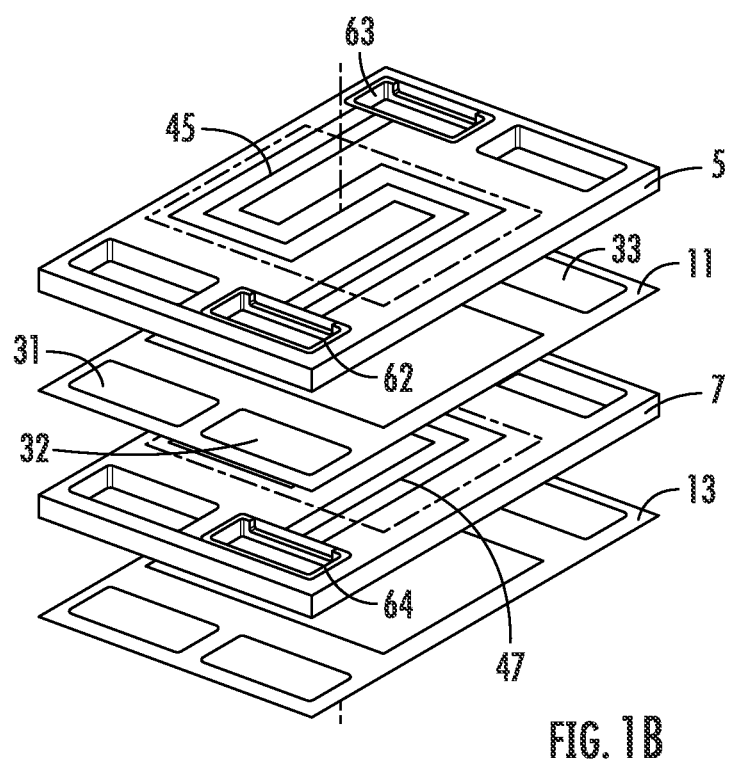
FIG. 1B illustrates an isometric exploded view of an electrolyzer with a distinctly shaped membrane in accordance with specific embodiments of the invention disclosed herein.
Figure 11:
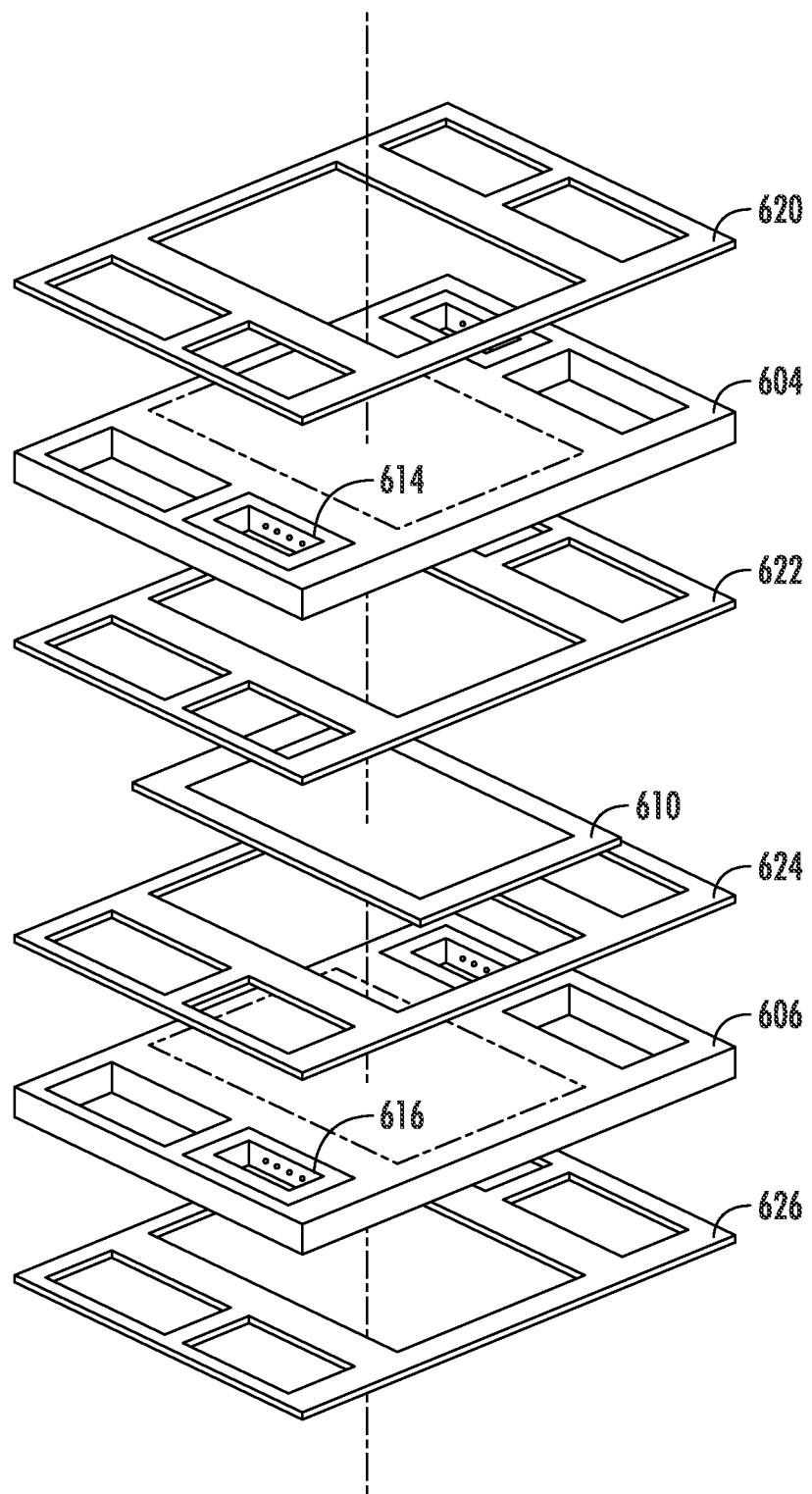
FIG. 11 illustrates an isometric exploded view of an electrolyzer assembly with insulating pieces positioned on two apertures of the polar plates in the electrolyzer assembly in accordance with specific embodiments of the invention disclosed herein.

The electrolyzer assemblies described herein can be composed of a plurality of cells, also called electrolysis cells. FIGS. 1A-1B and FIG. 11 illustrate various embodiments of an electrolyzer assembly in accordance with specific embodiments of the invention disclosed herein. An electrolyzer assembly can be formed of a plurality of electrolyzer cells. Electrolyzer cells can be configured to receive input fluids and release output fluids. These fluids may be liquids and/or gaseous. When the electrolyzer cell is operational, reactants present in the input fluids can be converted into valuable molecules which are withdrawn in the output fluids.

In specific embodiments, an electrolyzer assembly can comprise a plurality of cells arranged in a stack, each cell comprising at least one electrode configured to perform a reduction reaction or an oxidation reaction. The electrode may be a cathode configured to perform a reduction reaction or it may be an anode configured to perform an oxidation reaction. In specific embodiments, each cell comprises a cathode configured to perform a reduction reaction as well as an anode configured to perform an oxidation reaction. In specific embodiments, each cell can include one or more flow fields to allow the input and output fluids to flow through the cell.

In specific embodiments, an electrolyzer assembly can additionally comprise a conduit (also called a manifold) configured to transport an electrically conductive fluid, for example, an electrolyte or coolant. The electrolyzer assembly may comprise several conduits, at least one of them being configured to transport the electrically conductive fluid. These conduits may be configured to transport fluids in the electrolyzer. The conduits may fluidly connect flow fields in the electrolyzer assembly to allow the electrically conductive fluid to flow to specific electrolyzer cells and to circulate through the electrolyzer assembly. The fluids can be coolants for the electrolyzer assembly or the input and output fluids mentioned above with respect to the electrolyzer cells. An electrolyzer assembly can contain a plurality of conduits, for example from two to ten conduits (i.e., two, three, four, five, six, seven, eight, nine, or ten conduits).

As used herein with respect to the electrically conductive fluids described throughout the specification, the term "electrically conductive" means that the fluid is conductive to electricity, for example, a fluid with an electrical conductivity of greater than 0.1 milli-siemens per centimeter (mS/cm) at standard temperature and pressure is electrically conductive. In some embodiments, the electrically conductive fluid is an electrolyte, for example, an electrically conductive catholyte or an electrically conductive anolyte. In some other embodiments, the electrically conductive fluid is a coolant. In some other embodiments, the electrically conductive fluid is an electrically conductive gas. In some other embodiments, the electrolyzer assembly is arranged to transport both an electrically conductive catholyte and an electrically conductive anolyte, and optionally an electrically conductive coolant.

In specific embodiments, an electrolyzer assembly can additionally comprise at least two polar plates comprising flow fields configured to circulate an electrically conductive fluid. The flow fields may be configured to circulate the electrically conductive fluid through the electrolyzer assembly. The at least two polar plates may be configured to contact the electrically conductive fluid with an electrode (e.g., cathodes or anodes supported by said polar plates). The electrode may directly contact an electrically conductive electrolyte of the electrolyzer assembly. The electrode may also indirectly contact an electrically conductive coolant via the polar plate.

In specific embodiments, an electrolyzer cell can include a membrane electrode assembly (MEA). The MEA can be located between two polar plates in the electrolyzer cell. The membranes can selectively allow reactants to flow from the cathode or anode across the electrolyzer cell either to the opposite electrode or into a separating area. The MEA can include one or more of an aqueous separating layer, a solid separating layer, a proton exchange membrane (PEM), a cation exchange membrane (CEM), an anion exchange membrane (AEM), and various other membranes and structures for facilitating the operation of the electrolyzer assembly.

In specific embodiments, an electrolyzer assembly can comprise more than two polar plates. The polar plates can ensure mechanical support of an electrolysis stack, as well as electrical contact between successive stacked electrolyzer cells, by contacting the polar plate with the electrodes supported on each side of the polar plates. The polar plates can be electrically conductive and configured to apply an electric potential between a cathode and anode pair of each individual electrolyzer cell. In specific embodiments, the polar plates create an isopotential surface area. A cathode and anode pair may be herewith defined as the combination of one anode and one cathode of an individual electrolyzer cell, configured to carry out an electrochemical reaction when sufficient difference in electric potential is applied between these two electrodes. The polar plates can provide means for contacting at least one fluid with at least some electrodes in the electrolyzer assembly, wherein at least one of these fluids may be an electrolyte. In particular, the polar plates may be configured to transport the electrolyte and/or other fluids in the electrolyzer assembly, for example, to receive the input electrolyte and input fluids, as well as to release or remove the output electrolyte and output fluids, and optionally to circulate coolants. The flow fields described above may be formed in or on the polar plates to facilitate this objective.

In specific embodiments, an electrolyzer assembly can comprise two types of polar plates (i.e., monopolar plates and bipolar plates). Monopolar plates may be provided at each end of the cell stack. Monopolar plates comprise one active face and one inactive face. The active face of a monopolar plate is in contact with an electrode (e.g., the cathode at one end of the stack and the anode at the opposite end of the stack). Moreover, a monopolar plate can also provide electrical interfaces between an electrolyzer stack and an external power sink, for accepting power generated by the electrolyzer, or an external power source providing electrical current to allow the electrolyzer reactions to occur. Bipolar plates may be positioned at the top or bottom of each electrolyzer cell of the stack and provide an electrical link between an MEA of the cell and an adjacent cell. Bipolar plates may be positioned at the top or bottom of each cell of the stack and provide the electrical link between the MEA of the cell and an adjacent cell. Bipolar plates comprise two active faces, one of the active faces being in contact with the anode of one cell in the stack, the opposite active face of the bipolar plate being in contact with the cathode of the adjacent cell in the stack. Such a configuration allows for successive cells in the electrolyzer assembly to be in series electrically. In these embodiments, the active face of the polar plates comprises flow fields configured to contact a fluid, for example, an electrolyte, with the electrode, as detailed to a greater extent below.

The polar plates may have various shapes including but not limited to circular or polygonal shapes. They may, for example, be rectangular or square, pentagonal, hexagonal, or octagonal. The shape of the polar plates generally matches the shape of the individual cells. In specific embodiments, the polar plates have dimensions that are distinct from the dimensions of the cells, for example, they may be larger and/or wider. In specific embodiments, polar plates arranged in an electrolysis stack, may have identical, similar, or distinct shapes. In specific embodiments, the polar plates in the electrolyzer preferably have the same shape. FIG. 1A illustrates an electrolyzer assembly where the polar plates have dimensions which are distinct from the dimensions of the cells. FIG. 1B illustrates an electrolyzer assembly wherein the polar plates have the same external dimensions as the cells.

In specific embodiments of the invention, the flow fields to circulate and/or produce an even distribution of the fluids in the electrolyzer cell may be formed on or in the polar plates. The flow fields may be formed on the surface of the polar plate and be defined by channels and ribs at the surface of the polar plates, for example at the surface of the active faces of the polar plates. The flow fields may be carved, engraved, milled, stamped, etched, or molded in the polar plates (e.g., at the surface of the polar plates). FIGS. 1A-1B depict various designs of the flow fields on the active face of the bipolar plates, according to specific embodiments of the present invention which are not intended to be limiting. Polar plate flow fields may also circulate coolants across the bipolar polar plates. Such flow fields may for example be internal, i.e., located within the structure of the polar plate. In this case, they may be in the form of internal channels.

In specific embodiments, the flow fields may have patterns of various kinds. The design and size of the flow fields are not limited herein. The specific dimensions of the flow fields, including ribs forming flow field channels at the surface of polar plates, and the overall size of the flow fields may vary greatly from one embodiment to another, and are usually a function of the electrolyte or circulating fluid properties, temperature, pressure and power demand of the electrolyzer. For example, flow fields may have various ratios of channel/rib surface to vary the compression of the electrode vs. the mass transport of the reactants and products to and from the electrode. In specific embodiments, the flow fields comprise a ladder, single or multiple serpentines, interdigitated patterns, pillars, bio-inspired leaf-like shapes, or a mixture thereof. In specific embodiments, the flow fields have multiple entries across the polar plates to optimize fluid distribution across the plate.

In specific embodiments, an electrolyzer assembly can include an insulating layer arranged between a polar plate and an electrically conductive fluid. For example, the insulating layer could be positioned between a conductive surface of a flow field of the polar plate and a conduit of the electrolyzer assembly. The insulating layer could include at least one opening to fluidly connect the flow field to the conduit. The insulating layer can be an insulating coating formed to cover the polar plate such as by covering an edge of the polar plate. The insulating layer can be an insulating coating to cover a portion of a flow field. Alternatively, the insulating layer can be an insulating piece that is attached to the electrolyzer assembly. FIGS. 2A-2D, FIG. 5, and FIGS. 7A-7B illustrate specific embodiments of the insulating layer.

In specific embodiments, the insulating layer is configured to isolate the electrically conductive fluid (which circulates in the electrolyzer assembly when it is in operation), for example, the electrolyte or coolant, from the conductive polar plates (i.e., monopolar plates and/or bipolar plates), thereby significantly reducing leakage currents which could occur between two or more adjacent polar plates, and potentially preventing leakage currents from occurring at all.

In specific embodiments, the insulating layer may present various shapes. The insulating layer can be particularly adapted to the shape and size of the polar plate. The insulating layer can be adapted to cover a surface area of the polar plate which would otherwise be in contact with the electrically conductive fluid, for example, the electrolyte or the coolant, when the electrolyzer assembly is in operation.

Figure 7A:
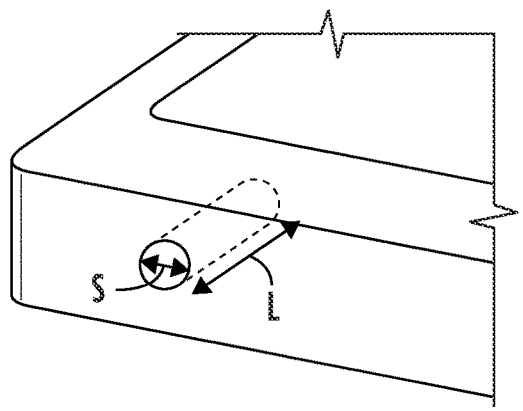
FIG. 7A illustrates an isometric view of an insulating layer in accordance with specific embodiments of the invention disclosed herein.

In specific embodiments of the invention, by covering a portion of the polar plate or flow field which would otherwise be in contact with the electrically conductive fluid, the insulating layer can extend the length of the conductive pathway between polar plates in the system. As the conductance of such pathways is a function of their length, this extension of the conductive pathways can reduce the amount of leakage currents in the system. To this end, the insulating layer can have a length L which extends the conductive pathway between polar plates in the system by a distance L. In embodiments in which both adjacent plates are augmented with an insulating layer, this will result in an increase in the conductive pathway by 2L. In specific embodiments of the invention, this length L can be the width of a sidewall of an insulating piece, such as that shown in FIG. 2C, which separates a sidewall of a polar plate from a flow of the electrically conductive fluid in a conduit of the system (e.g., where that conduit fluidly connects a flow field of the polar plate with a flow field of an adjacent polar plate). In specific embodiments of the invention, this length L can be the lateral extent of an insulating coating applied to a polar plate such as is shown in FIG. 7A. In specific embodiments of the invention, the length L can be at least 100 μm, for example at least 500 μm, at least 1,000 μm or at least 1,500 μm. In these embodiments, the length L may range between 100 μm and 5 cm, for example between 500 μm and 4 cm or between 1 mm and 5 mm.

In specific embodiments, the polar plate comprises one or more apertures. FIGS. 1A-1B and 11 illustrate polar plates comprising four apertures, located at the periphery of the polar plates. These apertures may be configured to define the fluid conduits when the polar plates are aligned in the cell stack. These apertures may be generally located anywhere on the polar plates (e.g., in the central region of the polar plates and/or the periphery of the polar plates. In specific embodiments, the apertures are traversing meaning that fluids can travel across or through the polar plate.

In specific embodiments, each aperture of the polar plate can be configured to receive or release fluids. However, when installed in an electrolyzer stack, the apertures of the polar plates may be active or inactive. When active, the apertures are configured to receive or release fluids. When inactive, the apertures are not configured to receive or release any fluids. The polar plates may be configured to transport fluids from one aperture of the polar plate to another aperture of the polar plate. For example, a polar plate can receive an anodic input fluid and release the anodic output fluid on one active face of the plate, through two of its apertures. In this embodiment, the polar plate comprises two active apertures. The polar plate may further comprise additional apertures, active or inactive ones. For example, a bipolar plate may comprise four apertures, where two of the apertures are active on a first face and inactive on the second face, while the other two apertures are active on the second face and inactive on the first. In some embodiments, a bipolar plate can receive a cathodic input fluid and release the cathodic output fluid on one face, through two of its apertures, while it receives the anodic input fluid and releases the anodic output fluid on the opposite face of the plate, through two other apertures. In specific embodiments, the input fluids are charged with reactants, while the output fluids are charged with products. The terms "reactant" and "products(s)" refer herein to the entities involved in the reduction and oxidation reactions taking place in an electrolyzer assembly. Because monopolar plates only comprise one active face, monopolar plates only receive one input fluid and release one output fluid on the active face of the plate, through their active apertures.

In specific embodiments, the polar plates comprise a central region and a peripheral region. In these embodiments, the central region may notably comprise the flow fields, while the peripheral region comprises the apertures.

In specific embodiments, the polar plate comprises one or several ports. In these embodiments, the supply and release of the fluids, including the electrically conductive fluid, are operated through these ports. These ports may be further defined as inlet ports and outlet ports. These ports are connected to the flow fields on the polar plates. The ports may define channels connected to the flow fields on the polar plate. The channels may advantageously have a shape and a size that reduces the leakage currents.

In these embodiments, each polar plate may have at least one inlet port and at least one outlet port on each of its active faces. For example, each polar plate can have one inlet port for the input fluid and one outlet port for the output fluid on each of its active faces. For example, each polar plate can have one inlet port for the cathodic input fluid and one outlet port for the cathodic output fluid on one of its active faces, while the same polar plate can have one inlet port for the anodic input fluid and one outlet port for the anodic output fluid on the opposite face. In these embodiments, a monopolar plate, because they have only one active face, can have either a pair of inlet and outlet ports for cathodic input/output, or a pair of inlet and outlet ports for anodic input/output, while the opposite face of the monopolar plate is inactive.

In specific embodiments, the number of inlet and outlet ports for each input and outlet fluid may vary. For example, polar plates may comprise one inlet port and one outlet port. They may alternatively comprise several ports. Polar plates may for example comprise two, three, four, five, six, seven, eight, nine, or ten inlet and outlet ports.

The ports may be located in the polar plate apertures, in the embodiments in which polar plates comprise one or several apertures, as described above. FIG. 3B illustrates embodiments of an electrolyzer assembly wherein the polar plate comprises ports which are located in the apertures. In these embodiments, each active aperture of the polar plate may have at least one inlet port or at least one outlet port. Each active aperture of the polar plate may comprise several inlet ports or several outlet ports. The number of ports in each aperture may vary and be adapted to the design of the flow fields on the polar plates. In these embodiments, the polar plate comprises at least two active apertures, wherein one active aperture comprises at least one inlet port and the other active aperture comprises at least one outlet port. Inactive apertures on the polar plate do not specifically need to have inlet or outlet ports; however, they may still comprise inlet and outlet ports which are said to be inactive.

The ports may alternatively be located on the edges of the polar plate, for example when such polar plate does not comprise apertures.

In specific embodiments, the insulating layer is in the form of an insulating piece. In these embodiments, one or several insulating pieces may be arranged between the polar plate and the conduit(s). According to one embodiment, insulating pieces are arranged between the polar plate and the coolant conduit(s). According to another embodiment, insulating pieces are arranged between the polar plate and the input conduit(s). For example, insulating pieces may be arranged between the polar plate and the input electrolyte conduit only. As another example, insulating pieces may be arranged between the polar plate and all input fluid conduits. According to another embodiment, insulating pieces are arranged between the polar plate and the output conduit(s). For example, insulating pieces may be arranged between the polar plate and the output electrolyte conduit only. As another example, insulating pieces may be arranged between the polar plate and all output fluid conduits. According to another embodiment yet, insulating pieces are arranged between the polar plate and the conduits transporting the electrolyte fluid (i.e., input and output). According to another embodiment yet, insulating pieces are arranged between both i) the polar plate and the input conduits, and ii) the polar plate and the output conduits, for example, the input and output electrolyte conduits only or all input and output fluid conduits.

In specific embodiments, the insulating pieces may have various shapes and sizes. FIGS. 2A-2D illustrate various embodiments of the insulating piece of the present invention. The insulating pieces of the present invention may for example be of rectangular shape with a base and four walls. The insulating piece may preferably be hollow pieces to allow fluids to travel in the conduits when the insulating piece is positioned on the polar plate. At the end of the stack, the insulating pieces may have an opening on one side which will interface with the conduit but will not be completely hollow in that the side facing the top of the stack can be closed. When the insulating pieces have a base, this base may extend outside of the walls and form a shoulder which may be helpful during the manufacturing process, when positioning the insulating pieces on the polar plates, before stacking the components in an electrolyzer assembly.

Figure 4:
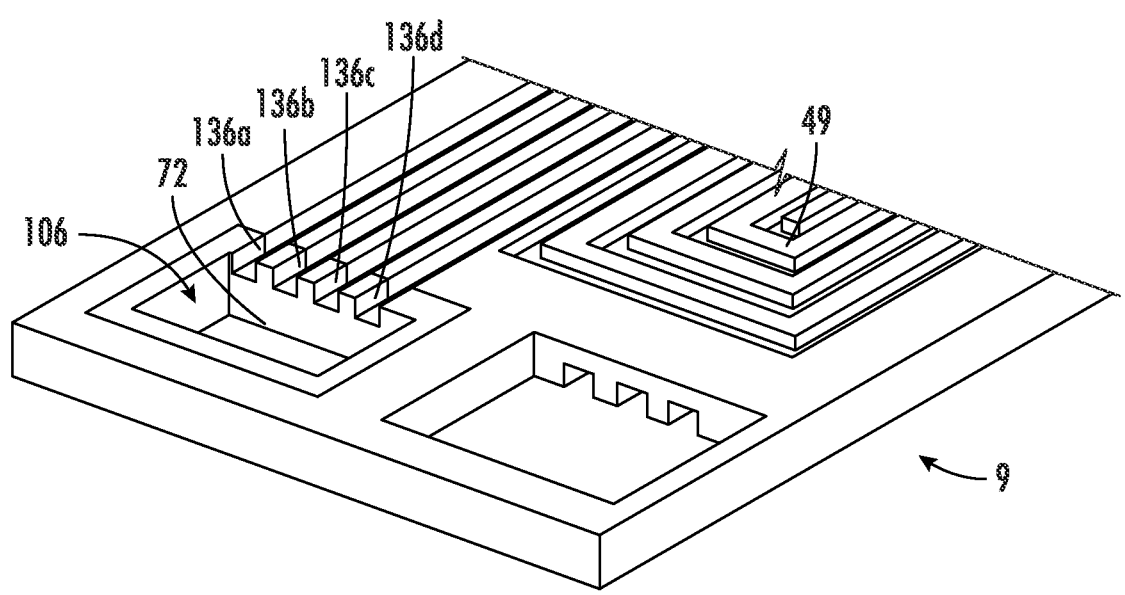
FIG. 4 illustrates an isometric view of an insulating piece with square trench openings attached to a bipolar plate in accordance with specific embodiments of the invention disclosed herein.

In specific embodiments, the insulating pieces can be shaped to be positioned (for example attached, glued, and/or clicked) on the polar plates before the electrolyzer assembly is put in operation. The insulating pieces may notably be positioned on the polar plates before assembling the electrolyzer, in particular before stacking the various components of the electrolyzer. In specific embodiments, the insulating pieces may be positioned in the area of the polar plates where the ports are situated, where leakage currents are more likely generated. FIG. 4 illustrates an embodiment of the electrolyzer assembly wherein an insulating piece is positioned in one of the polar plate's apertures. One or more insulating pieces may be positioned on each polar plate. In specific embodiments, only one insulating piece is positioned on each polar plate, wherein the insulating piece is intended to insulate the polar plate and the input electrolyte conduit. In specific embodiments, two insulating pieces are positioned on the polar plate, wherein one insulating piece is intended to insulate the polar plate and the input electrolyte conduit, while the other insulating piece is intended to insulate the polar plate and the output electrolyte conduit. In some other embodiments, four insulating pieces are positioned on each polar plate, wherein insulating pieces are intended to insulate the polar plate and the input and output conduits, for example, all the fluid conduits in an electrolyzer assembly. In specific embodiments, each polar plate comprises six openings, two of them being configured to transport coolant (in and out). In such embodiments, the insulating pieces may be positioned on each opening intended to be in contact with the coolant.

In specific embodiments, the insulating piece comprises at least one opening configured to connect the electrolyte conduit to the flow fields on the polar plate.

When the polar plate comprises one port to receive the electrically conductive fluid, for example, the electrolyte, the insulating piece may comprise one opening configured to connect the fluid conduit (e.g., as the input fluid conduit) to the flow fields on the polar plate. When the polar plate comprises three ports to release the electrically conductive fluid, for example, the electrolyte, from the polar plate, the insulating piece may comprise three openings configured to connect the flow fields to the fluid conduit (e.g., as the output fluid conduit). Therefore, the number of input or output fluid ports may, in some embodiments, be the same as the number of openings in the insulating piece. In specific embodiments, the flow field is a network of channels connecting the opening inlet and outlet together which is designed to evenly supply an electrode surface with fluids/reactants.

In specific embodiments, the insulating piece may be part of a kit including several parts. FIG. 3C illustrates an insulating piece along with an insert which may form part of such a kit. The insert may, for example, be used to distribute the fluid in the flow fields or collect the fluid from the flow fields. According to this embodiment, the input fluid travels from the conduit to the insulating piece through an opening of the insulating piece, through the insert, and then to the flow field; and the output fluid travels from the flow field, through another insert, through an opening in an alternative insulating piece, and to the output conduit. The fluid may notably circulate within the insert through channels, the design of which is not limited herein. According to these embodiments, the polar plate may comprise a groove intended to receive such an insert. For example, in specific embodiments, a polar plate can comprise two grooves on each face, such grooves being intended to receive inserts, and such inserts being designed to fit the polar plate groove and connect to the flow fields. The inserts, including any formed therein channels, are not limited with respect to their design and size. The inserts may have patterns of various kinds (e.g., with one channel from the insulating piece dividing into several channels to match a flow field or vice versa). The inserts can also extend the conductive pathways by providing channels that fully insulate surfaces of the polar plates or flow fields from the fluid.

In specific embodiments, the opening(s) on the insulating piece may be of various sizes and shapes. In particular, the size and shape of the openings on the insulating piece can be generally adapted to the size and shape of the ports on the polar plates, or to the presence of inserts when they are used. In specific embodiments, the size and shape of the openings on the insulating piece match the size and shape of the ports on the polar plate. In some embodiments, the opening(s) on the insulating piece are designed to interface with the ports on the polar plate. In some other embodiments, the size and shape of the openings on the insulating piece match the size and shape of the openings on the insert piece. FIGS. 2A-2D illustrate various specific embodiments of the insulating piece with openings presenting various designs and numbers. The openings on the insulating piece can also be designed to increase the conductivity of conductive pathways formed between adjacent polar plates through the electrically conductive fluid. For example, the cross-sectional surface area (S) of the openings can be minimized to minimize the electrical conductivity of the conductive pathway through the opening. As such, both the cross-sectional surface area (S) of the openings and the length (L) of the insulator layer can be selected to decrease the conductivity of the conductive pathway. In specific embodiments, the length L has the values presented above while the cross-sectional area S is smaller than 5 cm. In specific embodiments, the cross-sectional area is smaller than 1 cm. In specific embodiments, the cross-sectional area is smaller than 100 microns.

FIG. 7A illustrates a specific embodiment of an insulating piece of the present invention with one opening characterized by its length L and its cross-sectional area S. The length L corresponds to the thickness of the wall as illustrated in FIG. 2C.

In specific embodiments, the insulating piece comprises at least one opening which is characterized in that it presents a shape and length to increase the distance traveled by the fluid between the conductive surfaces of two polar plates. References can be made to FIGS. 8-10 which illustrate the effects of the presence of the insulating piece on the leakage current streams, in particular the beneficial effect of adjusting, i.e., increasing, the length L of the opening or reducing the cross-sectional area S to solve the problem of the leakage currents. In specific embodiments of the invention, each opening in the insulating piece has a shape that satisfies the equation:

$$j_{leak}^{targeted} = U_{cell} \times \frac{S}{L} \times \sigma_{anolyte}$$

where $j_{leak}^{targeted}$ is the targeted leakage current for the system, $U_{cell}$ is the electrolyzer cell operating voltage, S is the cross-sectional surface area of the opening through the isolator, L is the length of the path through the opening in the isolator, and $\sigma_{anolyte}$ is the electrical conductivity of the liquid. The same equation can be used to design a set of openings in the insulating piece with the value "S" comprising the sum total of the cross-section areas of the multiple openings in the insulating piece. In the case of uniform openings, the value "S" can be replaced by "S'×nb" where the S' is the size of an individual opening and nb is the number of openings. In specific embodiments of the invention, the targeted leakage current between adjacent plates in an electrolyzer assembly is less than 20% of the operating current of the electrolyzer assembly. In specific embodiments of the invention, the openings of the insulator can be configured according to the equation provided above and the teachings herein to achieve a reduction in leakage current to 5% of the operating current of the electrolyzer assembly. In specific embodiments of the invention, the openings of the insulator can be configured according to the equation provided above and the teachings herein to achieve a 10 fold reduction in leakage current as compared to the same electrolyzer assembly without the insulating pieces disclosed herein.

In specific embodiments, the insulating piece may be made of any insulating material, for example, but not limited to any insulating polymeric composition. For example, the insulating piece can be made of a polymer selected from the group consisting of acrylonitrile butadiene styrene (ABS), polytetrafluoroethylene (PTFE), polypropylene (PP), polyethylene (PE), polyolefins, polyvinyl chloride (PVC), polyamide (PA, nylon), polyvinylidene difluoride (PVDF), polyaryletherketones (PAEK, including PEEK), polyethylene terephthalate (PET), perfluoroalkoxy (PFA), polycarbonate (PC), polystyrene, polysulfones, polyurethane, polyarylene sulfide (PAS, including PPS), polyetherimide (PEI) and polyimide (PI). In specific embodiments, the material is selected among materials that are heat resistant as energy losses in electrolyzers may lead to the generation of heat. The insert piece, which may be a separate part of the insulating piece described herein, may be made of the same material as the insulating part, for example, the polymer described above.

In specific embodiments, the electrolyzer assembly may further comprise at least one gasket configured to seal the polar plate and the insulating piece. The gaskets may be made of a material such as silicone rubber. In some embodiments, a polar plate can comprise at least one groove for insertion of the insulating pieces, the inserts, and/or the gaskets. The term "gasket" is used herein in a broad sense, as a shaped sheet or ring of rubber, polymer, or other material sealing the junction between the polar plates and the insulating pieces. Such gaskets may be advantageously made of an insulating material. Gaskets may be advantageous for their sealing functions, or leak-tight properties. FIG. 11 illustrates a specific embodiment of the electrolyzer assembly comprising gaskets.

In specific embodiments, the polar plates and the insulating pieces, and optionally the inserts, are assembled prior to the stacking of the electrolyzer components. The insulating pieces, including the inserts if present, may for example be glued, attached, or clicked on the polar plates.

In specific embodiments where the electrolyzer assembly comprises gaskets, the insulating pieces and the polar plates may be assembled together using the gasket, which can for example be positioned between the polar plate and the insulating piece.

In specific embodiments, the insulating layer comprises an insulating coating. In particular, the insulating layer may be in the form of an insulating coating. In these embodiments, the insulating coating may reduce the surface of contact between an electrically conductive fluid and the polar plate and thereby decrease the conductance of a conductive pathway through the electrically conductive fluid between adjacent polar plates. In particular, the insulating coating may be configured to reduce the surface of contact between the electrolyte and the polar plate in the area where the ports are located (e.g., the area of the plate receiving or releasing the electrolyte or the fluids).

Figure 5:
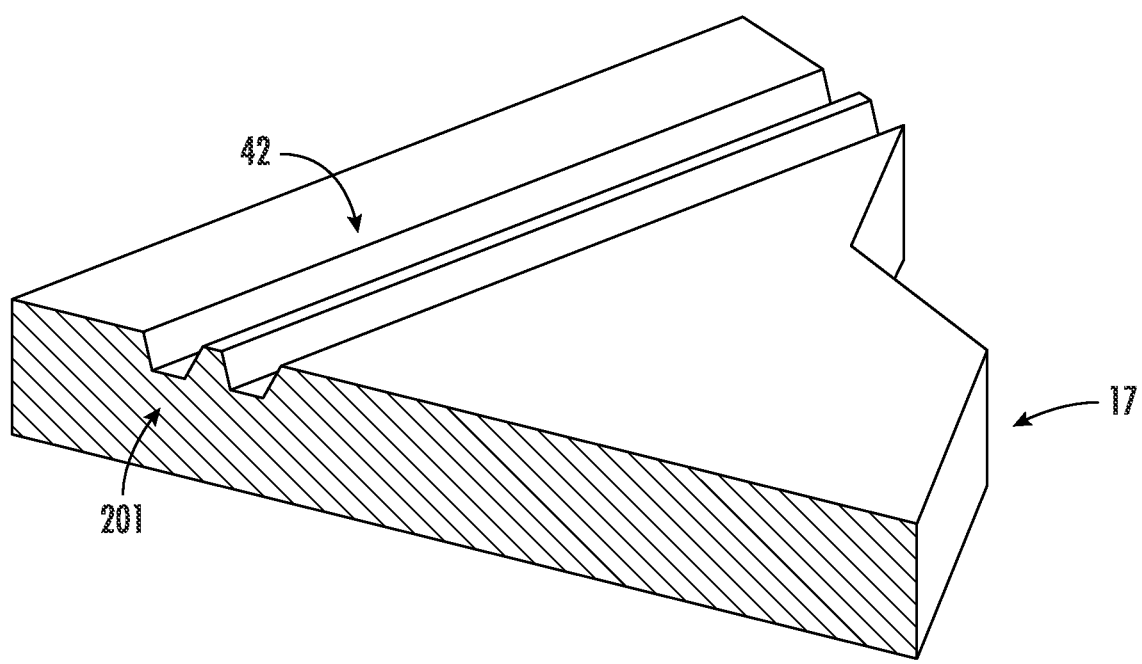
FIG. 5 illustrates an isometric view of a polar plate with an insulating layer in accordance with specific embodiments of the invention disclosed herein.
Figure 7B:
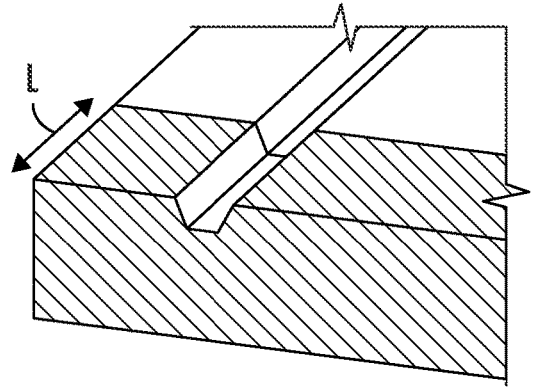
FIG. 7B illustrates an isometric view of an insulating layer in the form of an insulating coating of an edge of a bipolar plate in accordance with specific embodiments of the invention disclosed herein.

FIG. 5 and FIG. 7B illustrate a polar plate with an insulating coating, according to an embodiment of the electrolyzer assembly of the present invention. FIG. 7B illustrates a specific embodiment of an insulating layer where the coating covers one edge of the polar plate, as well as a surface of the active face of the polar plate from such edge. In particular, the length L of such surface, from the edge of the polar plate, could be the values provided above with respect to the L of the insulating layer generally.

In specific embodiments of the invention, each cell of the electrolyzer assembly may comprise an MEA comprising a cathode configured to perform a reduction reaction of a reactant of a cathodic input fluid and an anode configured to perform an oxidation reaction of a reactant of an anodic input fluid separated by one or more membranes. The one or more membranes can be at least one ion-conducting interface between the anode and the cathode. The MEA can also include one or more catalysts integrated into and/or in contact with the cathode and the anode, and one or more porous layers in contact with the cathode and the anode. In the context of the present disclosure, as explained above, at least one of the cathodic or anodic input fluid can be an electrically conductive electrolyte.

In specific embodiments of the invention, the electrolyzer stack can include MEAs sandwiched between two polar plates, as described below and illustrated in FIGS. 1A and 1B or FIG. 11 (with gaskets to seal the components together and keep anode and cathode network leak tight, avoiding any direct contact between reactants).

In specific embodiments where the ion-conducting interface comprises a fluid, an additional central at least partially hollow flow field may be positioned between the anode and cathode to allow for the circulation of such additional fluid while providing mechanical integrity to the MEA.

In specific embodiments, the electrodes of the electrolyzer assembly may be flat or porous. In specific embodiments, the electrodes can be porous. Porous electrodes are composite solids containing interconnected cavities. Compared to flat electrodes, interconnected cavities in the porous electrodes can change the species transport behavior and/or electrochemical behavior of the electrode. In specific embodiments in which the electrode is porous, it may be selected from carbon-based porous supports or inorganic porous support such as but not limited to metal-based porous material or a combination thereof. For example, porous electrodes may be made of titanium, nickel, silver, or others.

In specific embodiments, the electrolyzer electrodes comprise a catalyst, which may be integrated into the electrodes and/or in contact with the electrodes. In specific embodiments, the anode comprises a catalyst, for example in the form of a layer, which oxidizes a reactant in the anodic fluid to produce a product. As explained below, the anodic catalyst may be embedded into, dispersed onto, or deposited onto a porous support. In specific embodiments, the cathode comprises a catalyst, for example in the form of a layer, which reduces a reactant in the cathodic fluid to produce a product. The cathodic catalyst may be embedded into, dispersed onto, or deposited onto a porous support.

In specific embodiments, an ion-conducting interface, also called ion-conducting media, can be used between the cathode and anode to ensure both efficient physical separation and ion conduction between the cathodic and anodic compartments. The ion-conducting interface may comprise one or more membranes, ion-conducting electrolytes, diaphragms, or oxide-conducting materials such as ceramics. In specific embodiments, membranes can be selected among polymer-electrolyte membranes including, but not limited to, AEMs, CEMs, and/or bipolar membranes. In specific embodiments, the use of membranes can be advantageous because they mitigate the crossover of products/gases from the cathode to the separating layer.

In specific embodiments, an AEM may contain organic N-containing species that are positively charged, such as but not limited to pyridinium, imidazolium, and piperidinium, as well as additional functionality to improve mechanical/electronic stability, such as styrene or other aromatic or cross-linked polymers. Commercially available AEMs include, but are not limited to, Sustainion®, PiperION®, and Fumasep®.

In specific embodiments, a CEM may contain anion functionality, such as but not limited to those provided by sulfonate, phosphonate, or carboxylate groups. This may be supported on a polymer containing aromatic, aliphatic, or fluorinated carbon chains. Commercially available CEMs include but are not limited to, Aquivion® and Nafion®.

In specific embodiments, a bipolar exchange membrane can comprise any of the CEMs mentioned above paired with any of the AEMs mentioned above. In specific embodiments, a bipolar exchange membranes may be selected from commercially available products including, but not limited to, Fumasep® FBM and Xion. They may alternatively comprise a combination of the membranes described above. The bipolar exchange membranes may also include a central water dissociation layer with metal oxide particles, such as $TiO_2$, IrOx, or NiOx.

In specific embodiments, the catalysts can take on various forms. The catalysts may be in the form of layers. The catalysts may be either integrated into the electrodes and/or in contact with the electrodes. In particular, the catalyst integrated into and/or in contact with the anode can be capable of catalyzing the oxidation reaction of a reactant to produce a product. A catalyst integrated into and/or in contact with the cathode can be capable of catalyzing the reduction reaction of a reactant to produce a product.

In specific embodiments, the catalysts may be selected as one or a combination of materials including metal-based compounds, molecular species and additives. They may also comprise at least one material selected from the group consisting of single-metal-site compounds, metal compounds, carbon-based compounds, polymer electrolytes (also referred to as ionomers), metal-organic frameworks, and mixtures thereof. The molecular species may be selected from the group consisting of metal porphyrins, metal phthalocyanines, and metal bipyridine complexes. The additives may be halide-based compounds including F, Br, I, and Cl. The additives may be specifically configured to modify the hydrophobicity of the supports. Examples of such hydrophobic treatment include polytetrafluoroethylene (PTFE) and/or carbon black such as but not limited to Vulcan.

In specific embodiments, the catalysts employed herein may also comprise metal compounds, for example in the form of metal nanoparticles, nanowires, nano powder, nano-arrays, nanoflakes, nanotubes, dendrites, films, layers, or mesoporous structures. Such metal compounds may comprise Ag, Au, Zn, Cu, Ir, Pt, Fe, Ni, Co, Mn, Sn, Bi, Pd, Pb, Cd, Ru, Re, Rh, an alloy of such metals, or a mixture thereof. The single-metal-site compounds, or single-metal-site heterogeneous compounds, may comprise a metal-doped carbon-based material or a metal-N—C-based compound.

In specific embodiments, the polymer electrolytes may be one or a combination of species including the same materials as the ones used for the listed membranes.

In specific embodiments, the carbon-based compounds may comprise at least one material selected from the group consisting of carbon nanofibers, carbon nanotubes, carbon black, graphite, boron-doped diamond powder, diamond nano-powder, boron nitride, and a combination thereof.

In specific embodiments, the catalysts are embedded in, dispersed, or deposited onto porous supports. The porous supports can facilitate the diffusion of the anodic and cathodic fluids to the catalytic sites. The porous supports may be selected from the group consisting of carbon-based porous supports and inorganic porous support such as but not limited to metal-based porous supports, or a combination thereof.

In specific embodiments, carbon-based porous supports may be based on carbon fibers, carbon cloth, and carbon felt. They may, for example, be gas diffusion layers with or without microporous layers. Commercial carbon-based porous supports include, but are not limited to, Sigracet® 39BC, Sigracet® 35BC, Sigracet® 28BB, Sigracet® 28BC, Toray papers, Freudenberg® H23C6, Enomoto®, with or without microporous layer.

In specific embodiments, metal-based porous supports may be selected from the group consisting of titanium, stainless, nickel, and mixtures thereof. They may be in the form of a mesh, frit, foam, cloth, or plate.

In specific embodiments, the electrolyzer assembly of the present invention comprises: a plurality of cells arranged in a stack, each cell comprising: a cathode configured to perform a reduction reaction of a reactant of a cathodic input fluid; an anode configured to perform an oxidation reaction of a reactant of an anodic input fluid; wherein at least one of the cathodic or anodic input fluid is an electrically conductive electrolyte; at least four conduits configured to transport the electrically conductive electrolyte and the at least one other fluid; at least two bipolar plates comprising two active faces, such active faces comprising flow fields configured to contact the electrolyte and the at least one other fluid with the cathodes and anodes; and insulating layers arranged between the polar plates and the conduits transporting the electrolyte, said layer comprising at least one opening configured to connect the electrolyte conduits to the flow fields.

In this embodiment, the electrolyzer assembly may further comprise at least one, for example, two, monopolar plates, wherein each monopolar plate comprises one active face and one inactive face, such active face comprising flow fields configured to contact the electrolyte or the at least one other fluid with the cathodes and anodes.

In some embodiments, the electrolyzer assembly of the present invention comprises a plurality of cells arranged in a stack, each cell comprising an MEA comprising: a cathode configured to perform a reduction reaction of a reactant of a cathodic input fluid; an anode configured to perform an oxidation reaction of a reactant of an anodic input fluid; wherein at least one of the cathodic or anodic input fluid is an electrically conductive electrolyte; an ion-conducting interface between the anode and the cathode; catalysts integrated to and/or in contact with the cathode and the anode; porous layers in contact with the cathode and the anode; wherein: a) the cells are separated from each other by at least one bipolar plate; b) monopolar plates are provided at each end of the stack; c) each monopolar plate comprises one active face and one inactive face; d) each bipolar plate comprises two active faces, one of the active faces being in contact with the anode of one cell in the stack, the opposite active face of the bipolar plate being in contact with the cathode of the adjacent cell in the stack; e) each polar plate comprises at least four apertures configured to supply and remove the input and output fluids to the polar plate, at least two of these apertures being configured to supply and remove the electrically conductive electrolyte to the polar plate; f) the active face of the polar plates comprises flow fields configured to contact the fluids with the cathodes and the anodes; g) the assembly comprises at least four conduits configured to transport the fluids in the electrolyzer, at least two of these conduits being configured to transport the electrically conductive electrolyte; and h) insulating layers are arranged between the polar plates and the conduits transporting the electrolyte, said layer comprising at least one opening configured to connect the electrolyte conduits to the flow fields.

In specific embodiments, each polar plate of the electrolyzer assembly is such that the apertures are configured to define the conduits when the polar plates are aligned in the cell stack. In these embodiments, the conduits are formed when the polar plates are stacked in the electrolyzer assembly. These conduits are referred to herein as internal conduits. Reference can be made to FIGS. 1A, 1B, and 11 showing the alignment of the various components of the electrolyzer assembly according to specific embodiments of the present invention in which the conduits are internal conduits. When the components are stacked in the electrolyzer, the apertures align and create the conduits for circulating the fluids in the electrolyzer when in operation.

Figure 6:
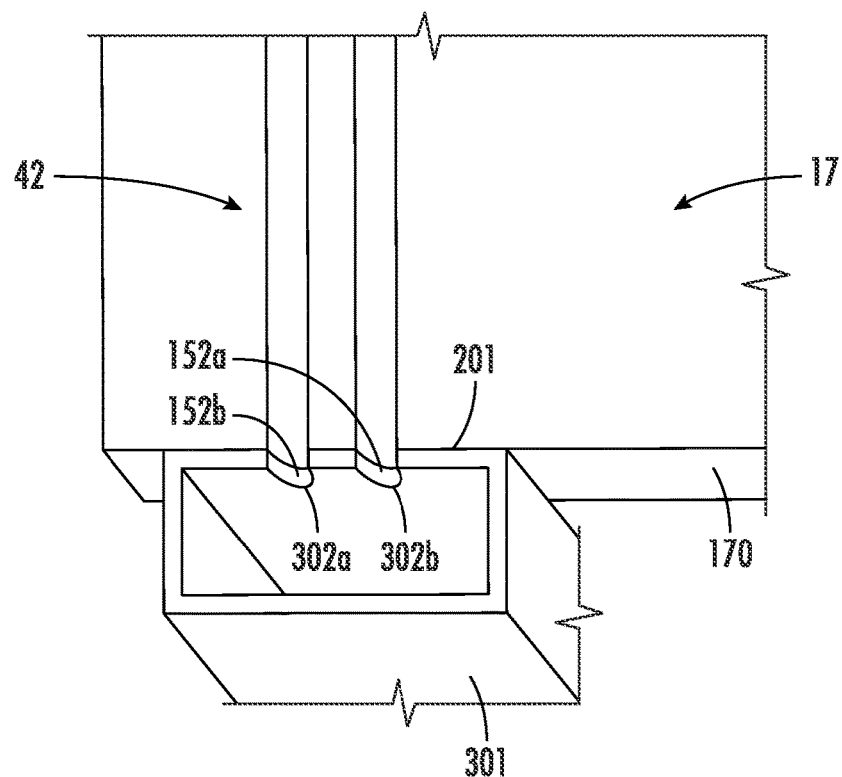
FIG. 6 illustrates a top perspective view of a polar plate with an insulating layer and a fluid conduit in accordance with specific embodiments of the invention disclosed herein.

In specific embodiments, the conduits are separate pieces of the electrolyzer assembly. These conduits are referred to herein as external conduits. Reference can be made to FIG. 6 which illustrates an embodiment wherein the conduit is an external conduit.

The plurality of electrolysis cells in the electrolyzer may be arranged according to various configurations.

In specific embodiments, the electrolysis cells can be arranged in series. According to these embodiments, the anode (where an oxidation reaction occurs) of a cell is electrically connected to the cathode (where a reduction reaction occurs) of the subsequent cell, and so on.

In specific embodiments, the cells may have various shapes including but not limited to circular, or polygonal. They may, for example, be rectangular (notably square), pentagonal, hexagonal, or octagonal. The cells arranged in an electrolysis stack, may have identical, similar, or distinct shapes.

As explained above, bipolar plates comprise two active faces, which means that both faces of bipolar plates comprise a plurality of flow fields. Because they are situated at one end of the cell stack, monopolar plates comprise only one active face, which means that only the face in contact with the electrode advantageously comprises a plurality of flow fields. The inactive face of the monopolar plate, which may be in direct or indirect contact with the end plate of the electrolyzer, generally does not comprise a plurality of flow fields.

In specific embodiments, each bipolar plate comprises at least four apertures which are configured to receive or release four distinct fluids. More particularly, the at least four apertures may be configured as follows: one aperture to receive the cathodic input fluid, such aperture defining one conduit when the polar plates are aligned in the cell stack, such conduit supplying the cathodic input fluid to the bipolar plate, one aperture to receive the anodic input fluid, such aperture defining one conduit when the polar plates are aligned in the cell stack, such conduit supplying the anodic input fluid to the bipolar plate, one aperture to release the cathodic output fluid, such aperture defining one conduit when the polar plates are aligned in the cell stack, such conduit removing the cathodic input fluid from the bipolar plate, and one aperture to release the anodic output fluid, such aperture defining one conduit when the polar plates are aligned in the cell stack, such conduit removing the anodic input fluid from the bipolar plate.

In specific embodiments, each monopolar plate comprises at least four apertures, wherein two of these apertures are active and two are inactive. The active apertures are configured to receive input and output fluids, similarly to the bipolar plates, while the inactive apertures are not intended to receive or release any fluids. Monopolar plates may still comprise at least four openings, even if they do not intend to actively receive and release four distinct fluids, because monopolar plates are part of a stack comprising bipolar plates comprising themselves at least four apertures, the overall cell stack being configured to define at least four manifolds when the polar plates are aligned in the cell stack. In these embodiments, the monopolar plate apertures may be configured according to two embodiments as follows. In a first embodiment: one aperture to receive the cathodic input fluid; one aperture to release the cathodic output fluid; and two inactive apertures. In a second embodiment: one aperture to receive the anodic input fluid; one aperture to release the anodic output fluid; and two inactive apertures.

As such, in these embodiments, each bipolar plate comprises at least four apertures which may be configured as follows: one aperture to receive the cathodic input fluid through the cathodic inlet port; one aperture to receive the anodic input fluid through the anodic inlet port; one aperture to release the cathodic output fluid through the cathodic outlet port; and one aperture to release the anodic output fluid through the anodic outlet port.

In these embodiments, each monopolar plate comprises at least four apertures which may be configured according to two embodiments as follows. In a first embodiment, one aperture to receive the cathodic input fluid through the cathodic inlet port; one aperture to release the cathodic output fluid through the cathodic outlet port; and two inactive apertures. In a second embodiment: one aperture to receive the anodic input fluid through the anodic inlet port; one aperture to release the anodic output fluid through the anodic outlet port; and two inactive apertures.

The polar plates described herein may comprise more than four apertures. They may, for example, comprise five, six, seven, or eight apertures altogether, four of them being intended for circulating the input and output fluids in the electrolyzer as explained above. The additional apertures may be configured to define additional conduits when the polar plates are aligned in the cell stack, wherein the manifolds may for example supply and/or remove coolant in the electrolyzer, or the additional conduits may be used for centering purposes.

The polar plates may comprise stainless steel (including, but not limited to, 316L), titanium, graphite, or any other conducting material. For example, the polar plates may be formed from a flat metal sheet, which provides the electrical conductivity and is simple to produce. The flat metal sheet may have a thickness of a few hundreds of micrometers, millimeters, or centimeters e.g., 100 µm to 5 cm, notably 100 µm to 1 cm, notably 5 mm to 5 cm, and notably 1 mm to 5 mm.

In specific embodiments, the polar plates may be coated with one or more total or partial surface coatings, e.g., coatings comprising Ti, Cr, Nb, Ni, Fe, and Au. Surface coatings may be advantageous to minimize contact resistance and improve chemical resistance (notably to corrosion). The surface coatings may be on one face of the polar plates or on both faces of the polar plates, for example on one side of the bipolar plate or on both sides of the monopolar plate.

In specific embodiments, an electrolyzer assembly may further comprise at least one of: a cathode configured to perform a reduction reaction; an anode configured to perform an oxidation reaction; an ion-conducting interface between the anode and the cathode; catalysts integrated to and/or in contact with the cathode and the anode; porous layers in contact with the cathode and the anode; clamping plates; non-conductive gaskets to provide seal and insulation between the several components of the electrolyzer as needed; inlets for the input fluids and outlets for the output fluids; sensors/captors to analyze the input fluids and/or the output fluids-and/or any other parameter of the stack operation; actuators to regulate the entry and/or exit of the fluids in the electrolyzer and/or any other parameter of the stack operation; and/or a control system with memory and processors.

In specific embodiments, at the end of the stack, monopolar plates are in contact with terminal cells. Current collectors allow connection to an external power supply, which can also be used, among other elements, for electrical monitoring of the stack. The stack is assembled within a stack casing allowing its mechanical support, as well as providing and transporting the fluids, i.e., reactants and product, to and from the stack. The stack casing comprises end plates that ensure electrical isolation of the stack and provides the inlet and outlets for the circulating fluids, including the cathodic and anodic input and output fluids.

In specific embodiments, the components of the electrolyzer assembly, for example between the opposite end plates may be tightened together by a plurality of tie rods. Alternatively, the electrolyzer assembly may be placed in a box-shaped casing. Alternatively, it can be tightened using clamps, belts, or a combination of any of the above.

In specific embodiments, during operation of the electrolyzer, a reduction reaction takes place on the cathodic side, while an oxidation reaction takes place on the anodic side. These reactions take place in the electrolyzer, thanks to the circulating input and output fluids which carry the reactants and products. The reactants and the products may be in their neutral and/or ionized forms.

In specific embodiments, the cathodic input fluid comprises at least one reactant selected from the group consisting of $CO_2$, $CO$, $CO_3^{2-}$, $HCO_3^-$, any bicarbonate- or carbonate-containing solution, water ($H_2O$) in liquid or vapor form, Ar, $N_2$, $NO_R$, $SO_x$, $H_2$, $CH_4$. The cathodic input fluid can be a stream derived from- a direct-air-capture unit, a $CO_2$ capture unit from water, including sea water, an industrial exhaust of any type such as but not limited to from a chemical plant, a refinery, a power plant, a steel mill, a cement factory, an alcohol-producing plant or any bioreactor including but not limited to a fermenter, a biogas plant, all of the previous with or without prior capture and/or purification and/or separation pre-treatment. Such fluid can be provided at any pressure and/or temperature and the previous species can be provided in any physical state such as but not limited to liquid and/or gaseous and/or supercritical and/or solvated in a liquid. The cathodic stream can also comprise dissolved salts such as but not limited to CsOH, KOH, CsHCO$_3$, Cs$_2$CO$_3$, CsCl, CsBr, CsI, KHCO$_3$, K$_2$CO$_3$, KCl, KBr, KI, NaHCO$_3$, Na$_2$CO$_3$, NaCl, NaBr, and NaI. The cathodic input fluid provides the reactants to be electrochemically reduced.

In specific embodiments, the cathodic input fluid comprises a capture solvent (equally referred to as liquid sorbent) comprising the captured CO$_2$. The capture solvent may comprise one or a mixture of chemical solvents and/or physical solvents. Such solvent can be also mixed with water. The solvent employed can be any available in the state-of-the-art including one or a mixture of: water, alcohols such as but not limited to methanol, organosulfur compounds such as tetrahydrothiophene, propylene carbonate, ionic liquids, metal hydroxides such as but not limited to sodium hydroxide, cesium hydroxide, potassium hydroxide, metal bicarbonates and carbonates such as but not limited to cesium bicarbonate, cesium carbonate, potassium bicarbonate, potassium carbonate, sodium carbonate, sodium bicarbonate, ketones such as but not limited to acetone, amines in particular but not limited to alkanolamines such as but not limited to methyldiethanolamine, monothanolamine, diethylamine diethanolamine, diisopropanolamine, but also methanol, dimethyl ethers of N-methyl-2-pyrrolidone, polyethylene glycol or methanol. Such input fluid can be pressurized to produce a pressurized carbon-dioxide-comprising solvent, equally referred to as carbon dioxide-rich capture solvent. This can be advantageous to both capture the CO$_2$ from a dilute stream such as an industrial exhaust, an engine, a power generation plant, a direct-air-capture or seawater CO$_2$ capture system, a biogenic source, and directly react at least part of it in an electrolyzer system for the production of at least one CO$_2$-reduction product or a mixture thereof, such as but not limited to carbon monoxide, methane, ethylene, propylene, dimethyl ether, ethanol, propanol, formic acid, oxalate but also any other achievable alkane, alkene, carboxylic acid, alcohol, aldehyde or ketone. Such a system is particularly advantageous for the production of gaseous carbon-dioxide-reduction products such as but not limited to methane, CO, ethylene, propylene, and dimethyl ether, since it allows to take advantage of the lower solubility of the electrolysis-derived gaseous products compared to the solubility of CO$_2$ in the capture solvent, to separate the products from the unreacted CO$_2$ in the liquid sorbent that can be then recycled into the electrolyzer after potential additional pressurization. In such a system, the absolute pressure is preferably above 5 bar, notably 10 bar, in particular above 20 bar, preferably above 30 bar, notably above 40 bar, including above 50 bar, notably above 60 bar, preferably above 70 bar, notably above 80 bar, notably above 90 bar, in particular above 100 bar, preferably above 110 bar, notably above 120 bar, including above 130 bar, notably above 140 bar, preferably above 150 bar, notably above 160 bar, notably above 170 bar, preferably above 180 bar, notably above 190 bar, notably above 200 bar.

In specific embodiments, the anodic input fluid comprises at least one reactant selected from the group consisting of hydrogen (H$_2$), water (H$_2$O), organic matter such as but not limited to glycerol, dissolved salts in an aqueous or organic solution, for example, selected from the group consisting of CsOH, KOH, CsHCO$_3$, Cs$_2$CO$_3$, CsClO$_4$, CsCl, CsBr, CsI, Cs$_2$SO$_4$, KHCO$_3$, K$_2$CO$_3$, KClO$_4$, KCl, KBr, KI, K$_2$SO$_4$, NaHCO$_3$, Na$_2$CO$_3$, NaClO$_4$, NaCl, NaBr, and NaI, Na$_2$SO$_4$. The anodic input fluid provides reactants to be electrochemically oxidized. The presence of ions may also be beneficial to favor the ion-conducting activity of the ion-conducting interface such as but not limited to a membrane.

In specific embodiments, the oxidation reaction at the anode is selected from the group consisting of reactions undertaken in an acidic environment and reactions undertaken in an alkaline environment, such as but not limited to:

anodic reactions in an acidic environment such as:

  (1)

  (2)

  (3)

  (4)

  (5)

  (6)

  (7)

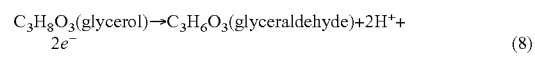  (8)

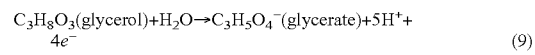  (9)

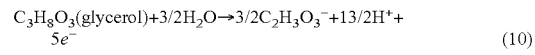  (10)

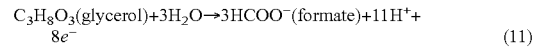  (11)

C$_3$H$_8$O$_3$(glycerol)+3H$_2$O→3/2C$_2$O$_4^{2-}$+14 H$^+$+11e$^-$  (12)

anodic reactions in neutral/alkaline environments such as:

  (13)

  (14)

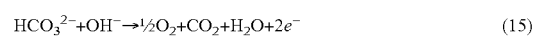  (15)

  (16)

  (17)

  (18)

  (19)

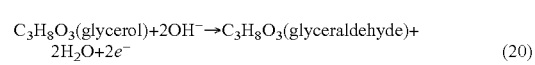  (20)

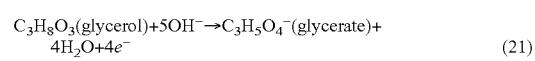  (21)

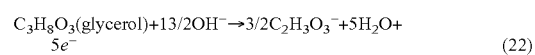  (22)

  (23)

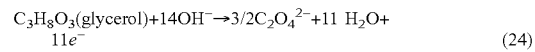  (24)

In specific embodiments, the reduction reaction at the cathode is selected from the group consisting of reactions undertaken in an acidic environment and reactions undertaken in an alkaline environment, such as but not limited to:

cathodic reactions in acidic environments such as:

$$CO_2 + 2H^+ + 2e^- \rightarrow CO + H_2O \quad (25)$$

$$CO_2 + 2H_2O + 2e^- \rightarrow HCOOH + 2OH^- \quad (26)$$

$$2CO_2 + 12H^+ + 12e^- \rightarrow C_2H_4 + 4H_2O \quad (27)$$

$$CO_2 + 8H^+ + 8e^- \rightarrow CH_4 + 2H_2O \quad (28)$$

$$2CO_2 + 12H^+ + 12e^- \rightarrow CH_3CH_2OH + 3H_2O \quad (29)$$

$$2CO_2 + 2H^+ + 2e^- \rightarrow COOH-COOH \quad (30)$$

$$2CO_2 + 4H^+ + 4e^- \rightarrow HCO-COOH + H_2O \quad (31)$$

$$2H^+ + 2e^- \rightarrow H_2 \quad (32)$$

$$2CO + 8H^+ + 8e^- \rightarrow C_2H_4 + 2H_2O \quad (33)$$

$$2CO + 8H^+ + 8e^- \rightarrow CH_3CH_2OH + H_2O \quad (34)$$

$$3CO + 6H^+ + 6e^- \rightarrow C_2H_3COOH + H_2O \quad (35)$$

$$3CO + 6H^+ + 12e^- \rightarrow C_3H_6 + 3H_2O \quad (36)$$

$$3CO + 12H^+ + 12e^- \rightarrow C_3H_8O + 2H_2O \quad (37)$$

cathodic reactions in neutral/alkaline environments such as:

$$CO_2 + H_2O + 2e^- \rightarrow CO + 2OH^- \quad (38)$$

$$CO_2 + H_2O + 2e^- \rightarrow HCOO^- + OH^- \quad (39)$$

$$2CO_2 + 8H_2O + 12e^- \rightarrow C_2H_4 + 12OH^- \quad (40)$$

$$CO_2 + 6H_2O + 8e^- \rightarrow CH_4 + 8OH^- \quad (41)$$

$$2CO_2 + 9H_2O + 12e^- \rightarrow CH_3CH_2OH + 12OH^- \quad (42)$$

$$2CO_2 + 2H_2O + 2e^- \rightarrow COOH-COOH + 2OH^- \quad (43)$$

$$2CO_2 + 3H_2O + 3e^- \rightarrow HCO-COOH + 3OH^- \quad (44)$$

$$2H_2O + 2e^- \rightarrow H_2 + 2OH^- \quad (45)$$

$$2CO + 6H_2O + 8e^- \rightarrow C_2H_4 + 8OH^- \quad (46)$$

$$2CO + 7H_2O + 8e^- \rightarrow CH_3CH_2OH + 8OH^- \quad (47)$$

$$2CO + 3H_2O + NH_3 + 4e^- \rightarrow C_2H_3CONH_2 + 4OH^- \quad (48)$$

$$3CO + 5H_2O + 6e^- \rightarrow C_2H_3COOH + 6OH^- \quad (49)$$

$$3CO + 9H_2O + 12e^- \rightarrow C_3H_6 + 12OH^- \quad (50)$$

$$3CO + 10H_2O + 12e^- \rightarrow C_3H_8O + 12OH^- \quad (51)$$

In these embodiments, as a result, the anodic output fluid may comprise at least one product selected from the group consisting of $O_2$, $CO_2$, $H_2O$, and mixtures thereof, such product being in its neutral form or in its ionized form. Also, the cathodic output fluid may comprise at least one product selected from the group consisting of CO, $CO_2$, HCOOH (formic acid), $CH_3CH_2OH$ (ethanol), $CH_4$ (methane), COOH—COOH (oxalic acid), COH—COOH (glyoxylic acid), $C_2H_4$ (ethylene), $C_3H_8$ (propane), $C_3H_6$ (propylene), $C_3H_8O$ (propanol) and mixtures thereof, such product being in its neutral form or in its ionized form. As an example, the formic acid product may be in the form of HCOOH or its corresponding ionized form $HCOO^-$.

During operation, one or more pumps may generate the flow of the fluid's reactants and products through the electrolyzer and polar plates flow fields inside the electrolyzer assembly.

Specific embodiments of the invention are now explained with reference to the figures, which are not intended to limit the scope of the present invention.

FIG. 1A and FIG. 1B illustrate electrolyzer assemblies according to some embodiments of the present invention.

FIG. 1A depicts two bipolar plates 4 and 6, and two MEAs 10 and 12. In particular, the MEAs 10 and 12 are separated from each other by the bipolar plate 6. The bipolar plates 4 and 6 each comprise four apertures, (i.e., apertures 21, 22, 23, and 24 on bipolar plate 4; apertures 26, 27, 28, and 29 on bipolar plate 6 (aperture 28 is not shown)). These apertures are located in the periphery of the polar plates and are of rectangular shape. The bipolar plates 4 and 6 also respectively comprise flow fields 44 and 46. The flow fields of the stack are for distributing the fluids over the faces of the MEAs 10 and 12.

FIG. 1B depicts a similar assembly as FIG. 1A, with two bipolar plates 5 and 7, and two MEAs 11 and 13; the MEAs 11 and 13 illustrated in FIG. 1B present a shape and size which are distinct from the shape and size of the MEAs 10 and 12 in FIG. 1A. Notably, the MEAs 11 and 13 comprises four apertures which align with the apertures of the bipolar plates 5 and 6. In particular, the MEA 11 comprises the apertures 31, 32, 33, and 34 (aperture 34 is not shown). The bipolar plates 5 and 7 also respectively comprise flow fields 45 and 47.

FIG. 1A and FIG. 1B also show insulating pieces attached to certain apertures of the polar plates. In particular, as shown in FIG. 1A, insulated pieces 52 and 53 are attached to bipolar plate 4, more precisely to respectively apertures 22 and 23 of bipolar plate 4. Also, insulating piece 57 is attached to aperture 27 of bipolar plate 6.

For example, the insulating piece 52 provides electrical insulation between the input conduit (not shown) and the aperture 22 of the bipolar plate 4. The insulating piece 53 provides electrical insulation between the output conduit (not shown) and the aperture 23 opening of the bipolar plate 4.

As shown in FIG. 1B, insulated pieces 62, 63, and 64 are attached to certain apertures of the bipolar plates 5 and 7.

FIGS. 2A, 2B, 2C and FIG. 2D illustrate specific embodiments of an insulating piece. Each of the insulating pieces illustrated on these figures is of rectangular shape with a base and four walls. The insulating pieces is generally traversing, which means that when the insulating piece is positioned on the polar plate, fluids such as an electrically conductive electrolyte, can travel in the conduits. The insulating piece in these embodiments are hollow pieces so that the fluids can travel across them and be distributed to the polar plates via their openings. As depicted in FIGS. 2A, 2B, 2C and FIG. 2D, the base extends outside the walls and forms a shoulder (i.e., reference 105 in FIG. 2A) all around the piece. Such shoulders may be helpful during the manufacturing process, such as when positioning the insulating pieces on the polar plates, before stacking the components in an assembly.

Figure 2A:
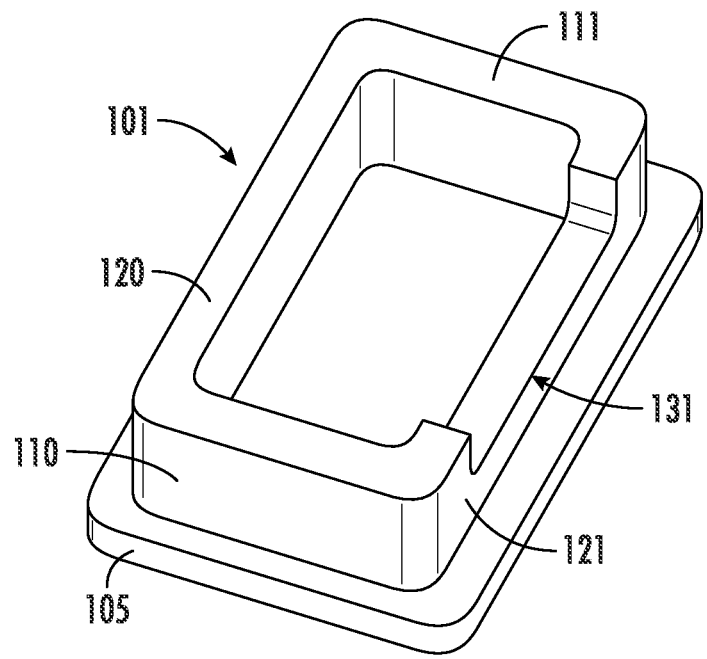
FIG. 2A illustrates an isometric view of an insulating piece with a trench opening in accordance with specific embodiments of the invention disclosed herein.

As shown in FIG. 2A, the insulating piece 101 comprises a base with a shoulder 105 and forms a first pair of opposite walls 110 and 111 parallel to each other and a second pair of opposite walls 120 and 121 parallel to each other and perpendicular to opposite walls 110 and 111 of said first pair. The wall 121 of the insulating piece 101 comprises an opening 131 configured to connect the conduit to the flow fields in the electrolyzer assembly. As detailed below, the thickness of the wall 121, referenced as L, can be adjusted to increase the leakage currents path between two polar plates.

Figure 2B:
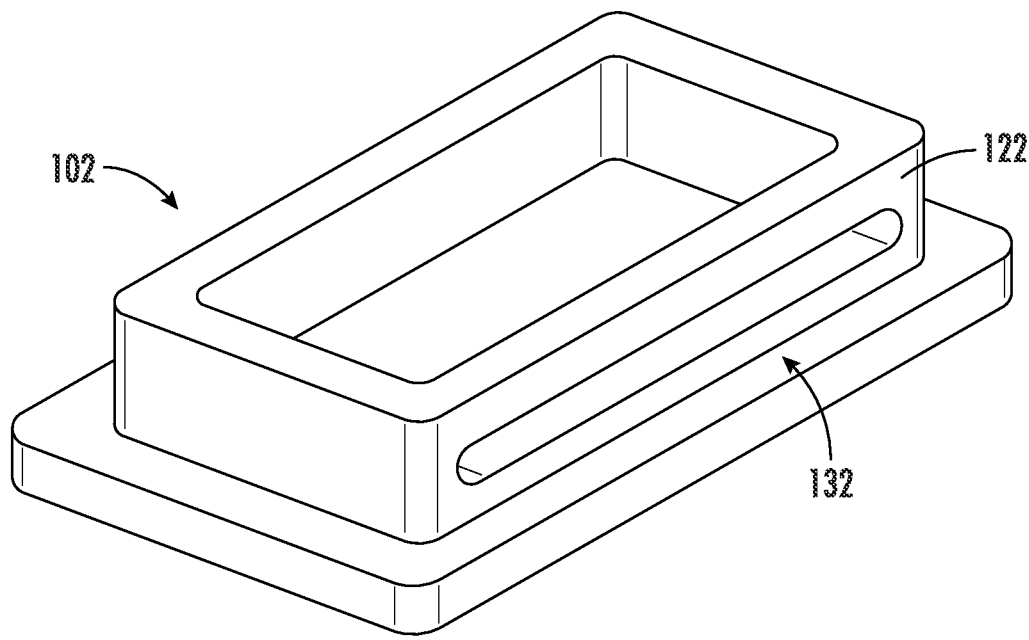
FIG. 2B illustrates an isometric view of an insulating piece with a tunnel opening in accordance with specific embodiments of the invention disclosed herein.
Figure 2C:
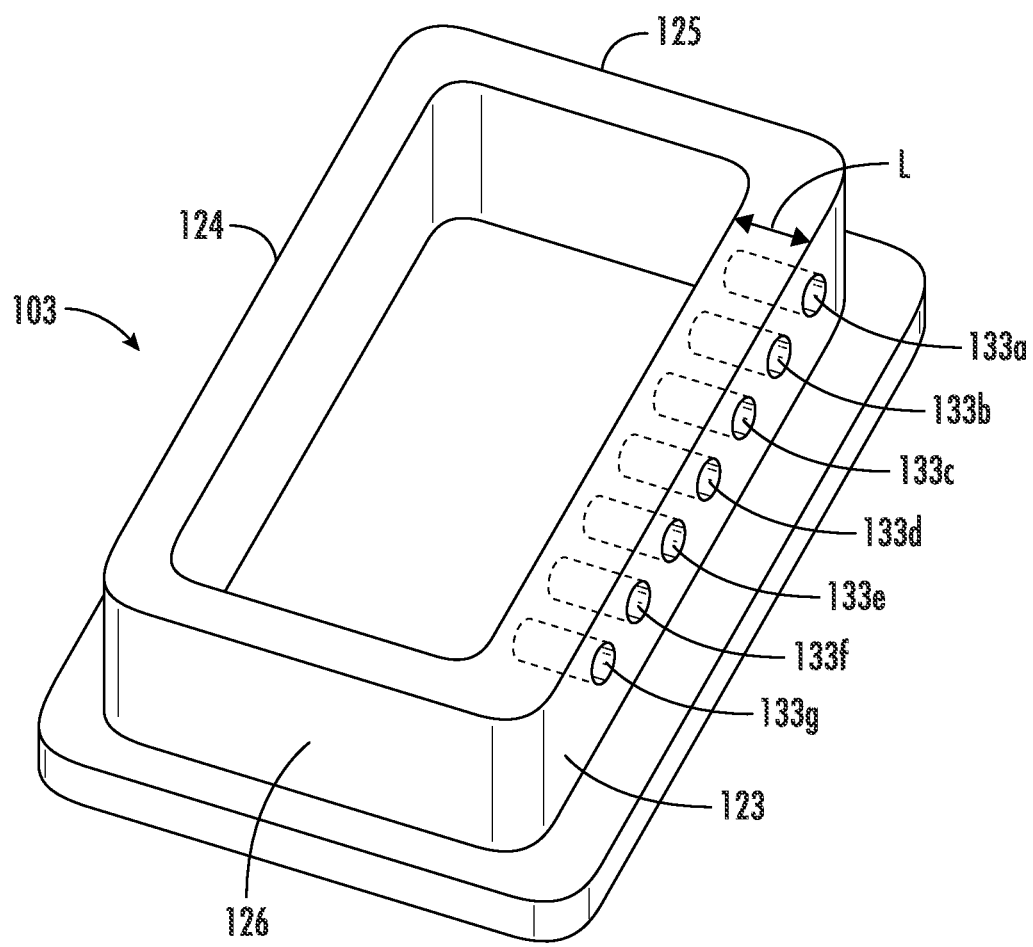
FIG. 2C illustrates an isometric view of an insulating piece with a plurality of round tunnel openings in accordance with specific embodiments of the invention disclosed herein.
Figure 2D:
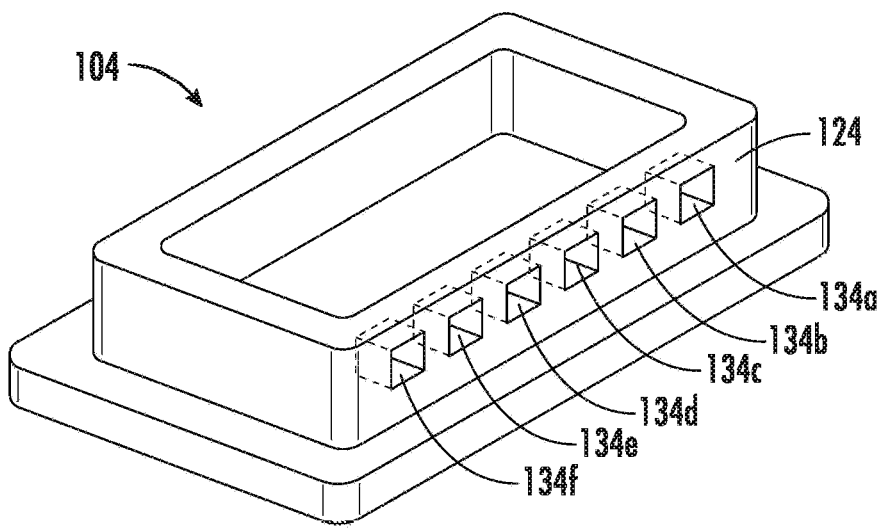
FIG. 2D illustrates an isometric view of an insulating piece with a plurality of square tunnel openings in accordance with specific embodiments of the invention disclosed herein.

As depicted in FIGS. 2B, 2C, and 2D, the openings 132, 133, and 134 of respectively the insulating pieces 102, 103, and 104 differ from the opening 131 of the insulating piece 101. The openings could be tunnels, such that the opening is entirely defined by surrounding insulating piece material in all directions that are normal to the main direction of the opening, or they may be trenches, with at least one side defined by a clearance. As shown in FIG. 2B, the insulating piece 102 comprises one opening 132 on wall 122, which is a tunnel.

As shown in FIG. 2C, the insulating piece 103 comprises several openings 133 on the wall 123. In particular, the insulating piece comprises seven openings 133a, 133b, 133c, 133d, 133e, 133f, and 133g. The illustrated seven openings 133 are all identical, but they can be of different shape and size. The number of openings may also be adjusted, based on the ports on the polar plate.

As shown in FIG. 2D, the insulating piece 104 comprises six openings 134 on the wall 124, i.e., openings 134a, 134b, 134c, 134d, 134e, and 134f. The openings 133 and 134 on the insulating pieces 103 and 104 are tunnels, in contrast to the opening 131 on the insulating piece 131 which is a trench.

The thickness L of the walls of the insulating piece may be adjusted to increase the distance between the electrolyte conduit and the flow fields on the polar plate. The thickness of the walls 121, 122, 123, and 124 which respectively comprise the opening(s) 131, 132, 137, and 138, may be adjusted to increase the distance between the electrolyte conduit and the flow fields on the polar plate. As illustrated in FIG. 2C, the thickness L of the wall 123 is greater than the thickness of the three other walls 124, 125, and 126 of the insulating piece.

In specific embodiments, the opening(s) (e.g., 131, 132, 133, or 134) of the insulating piece is(are) configured to interface with the flow fields of the polar plate to which the insulating piece is intended to be attached, in particular, to interface the ports of such polar plate.

Figure 3A:
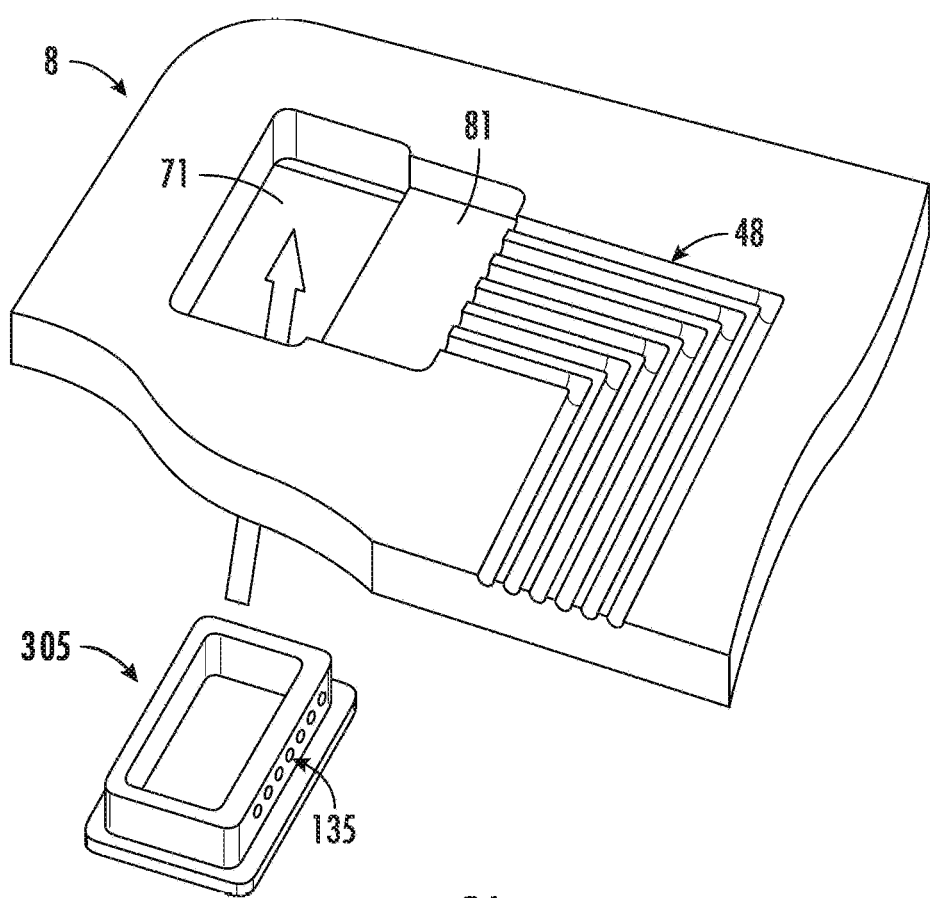
FIG. 3A illustrates an isometric view of an insulating piece before being attached to a polar plate in accordance with specific embodiments of the invention disclosed herein.
Figure 3B:
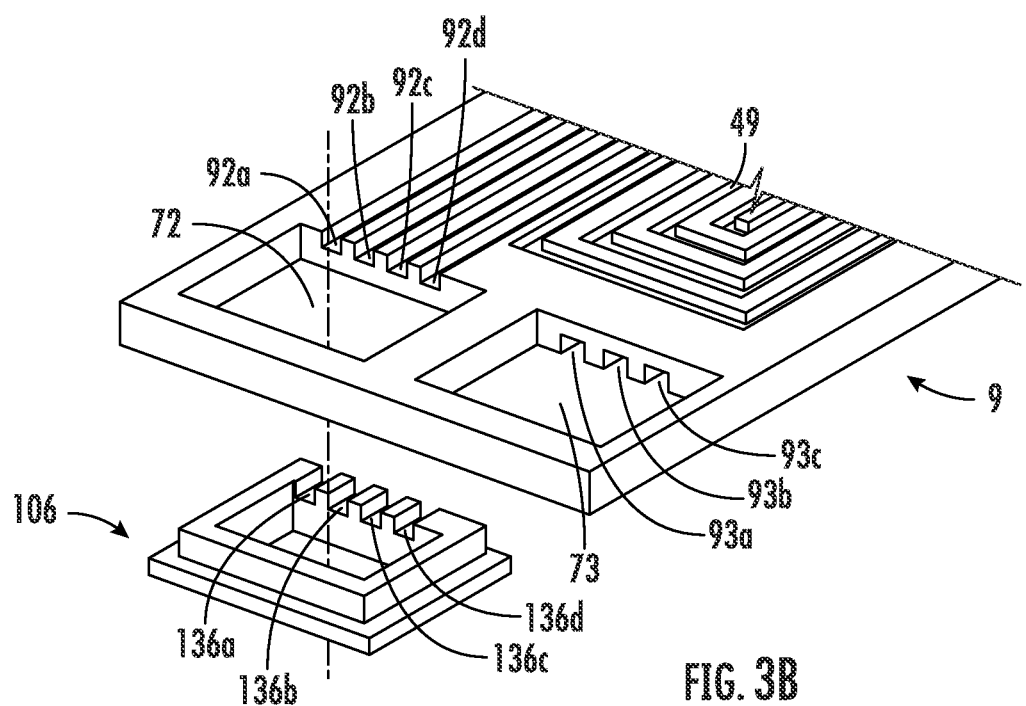
FIG. 3B illustrates an isometric view of an insulating piece with square trench openings before being attached to a bipolar plate in accordance with specific embodiments of the invention disclosed herein.
Figure 3C:
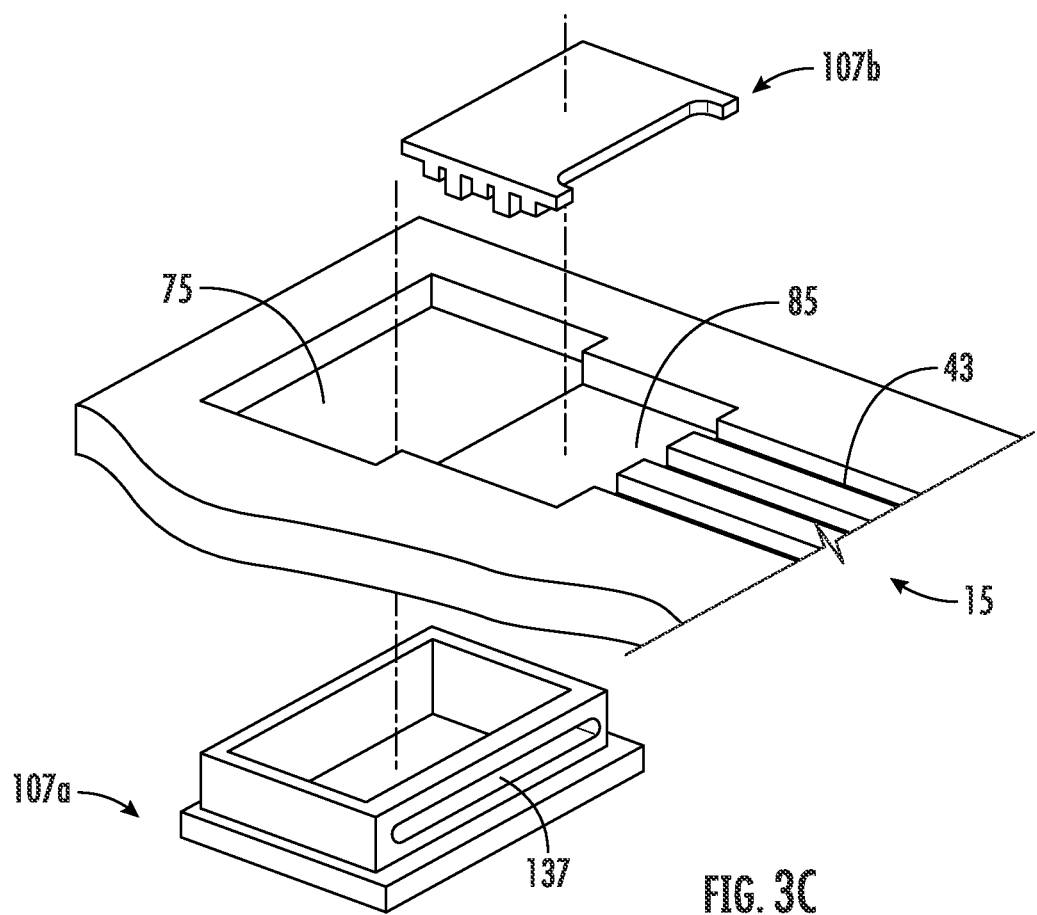
FIG. 3C illustrates an isometric view of an insulating piece with a tunnel opening and an accompanying insert in accordance with specific embodiments of the invention disclosed herein.

FIGS. 3A, 3B, and 3C illustrate an insulating piece according to specific embodiments, before being positioned (for example attached, glued, and/or clicked) on a bipolar plate, in perspective to the aperture in the polar plate. These figures illustrate specific embodiments of a kit of parts as described herein.

As shown in FIG. 3A, the insulating piece 305, with seven openings 135, presents a design which is adapted to fit the aperture 71 of the polar plate 8. The polar plate 8 also comprises a plurality of flow fields 48 and a cavity 81 which is intended to receive an insert, as detailed in FIG. 3C.

FIG. 3B depicts the insulating piece 106, with four openings 136, such insulating piece presenting a design which is adapted to fit the aperture 72 of the bipolar plate 9. The bipolar plate 9 also comprises a plurality of flow fields 49. FIG. 3B also illustrates the ports 92 on the polar plate which are located in the aperture 72 of the bipolar plate 9. The four ports 92a, 92b, 92c, and 92d may be inlet or outlet ports, through which is operated the supply of input fluids or output fluids, which can be an electrically conductive electrolyte. These ports 92 on the bipolar plate 9 are connected to the flow fields 49. In particular, the four openings 136a, 136b, 136c, and 136d are configured to interface the ports 92a, 92b, 92c, and 92d on the bipolar plate 9 and connect the circulating fluid (e.g., the electrically conducting electrolyte) to the flow fields 49.

The bipolar plate 9 also comprises an aperture 73 which shows ports 93 on the opposite face of the bipolar plate 9. These ports 93a, 93b, and 93c are connected to flow fields (not shown) on the opposite face of the bipolar plate 9.

Apertures 72 and 73, and respectively ports 92 and 93, on the bipolar plate 9, are intended to receive/release input fluids and/or output fluids.

FIG. 3C depicts the insulating piece 107a which is to be used with an insert 107b. The insulating piece 107a comprises one opening 137, such insulating piece 107a presenting a design which is adapted to fit the aperture 75 of the polar plate 15. The polar plate 15 also comprises a cavity 85, which is intended to receive the insert 107b. In particular, the insert 107b presents a design which is adapted to fit the cavity 85 and connect the fluids with the flow fields 43 on the polar plate 15. The insulating piece 107a and the insert 107b are intended to fit on each other and facilitate the circulation of fluids through the apertures of the polar plates.

More generally, when the insulating piece is in several parts, and comprises a part in the form of an insert, this insert may be used to distribute the fluid in the flow fluids or collect the fluid from the flow fields of the polar plate. This insert, including its channels (not shown in FIG. 3C), is not limited with respect to its design and size. As an example, the insert's channels may be such that one input channel divides into several output channels, notably when the polar plate comprises a plurality of flow fields. The number of output channels in the insert part of the insulating piece may be identical to the number of flow fields.

FIG. 4 illustrates a kit of parts according to specific embodiments, wherein an insulating piece 106 is positioned (e.g., attached, glued, and/or clicked) on a bipolar plate 9 in the aperture 72. In particular, the four openings 136a, 136b, 136c, and 136d are configured to interface the ports 92a, 92b, 92c, and 92d (not shown in FIG. 4) on the bipolar plate 9 and connect the circulating fluid (e.g., the electrically conducting electrolyte) to the flow fields 49.

FIG. 5 illustrates a polar plate 17 with an insulating layer 201, in the form of a coating covering polar plate 17. In the illustrated case, the insulating layer 201 covers an edge of the polar plate 17. The polar plate 17 notably comprises flow fields 42.

FIG. 6 illustrates a polar plate 17 with an insulating layer 201, in the form of a coating, wherein the polar plate comprises flow fields 42. The figure also depicts a conduit 301 which is in contact with one edge 170 of the polar plate 17. The polar plate 17 comprises two ports 152a and 152b, which are more precisely located on the edge 170 of the polar plate 17. According to this embodiment, the polar plates do not comprise apertures, which create fluid conduits when polar plates are aligned in the electrolyzer assembly. Instead, external conduits (e.g., external conduit 301) are used to transport the fluids in the electrolyzer assembly when the electrolyzer is in operation. In FIG. 6, the number of ports 152a and 152b on polar plate 17 is the same as the number of openings 302a and 302b in the conduit 301, and the number of openings (not shown) in the insulating layer 201.

FIGS. 7A-7B are isometric views of insulating layers according to specific embodiments of the present invention. FIG. 7A illustrates a specific embodiment of the insulating piece of the present invention with one opening characterized by its length L and its cross-sectional area S.

FIG. 7B illustrates a specific embodiment of the insulating layer in the form of an insulating coating wherein the coating covers one edge of the polar plate, as well as a surface of the active face of the polar plate from such an edge. FIG. 7B illustrates the length L of such surface, from the edge of the polar plate. The polar plates of an electrolyzer can have such a coating applied to other sides of the plate besides the one shown in order to provide a coating for conduits that are aligned on those sides.

Figure 8:
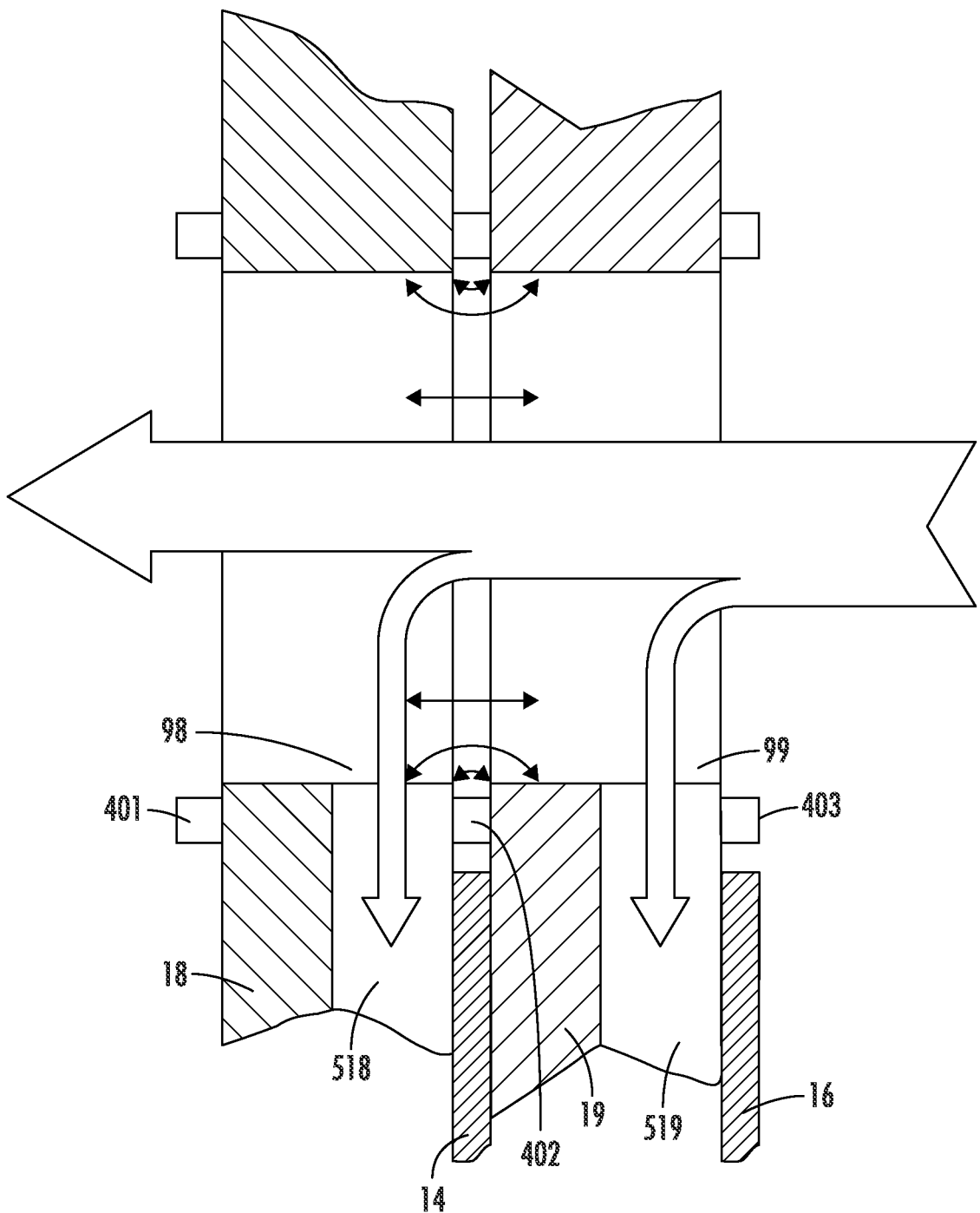
FIG. 8 illustrates a cross sectioned view of current leak streams between two consecutive polar plates in a stack without insulating pieces attached in accordance with the related art.
Figure 9:
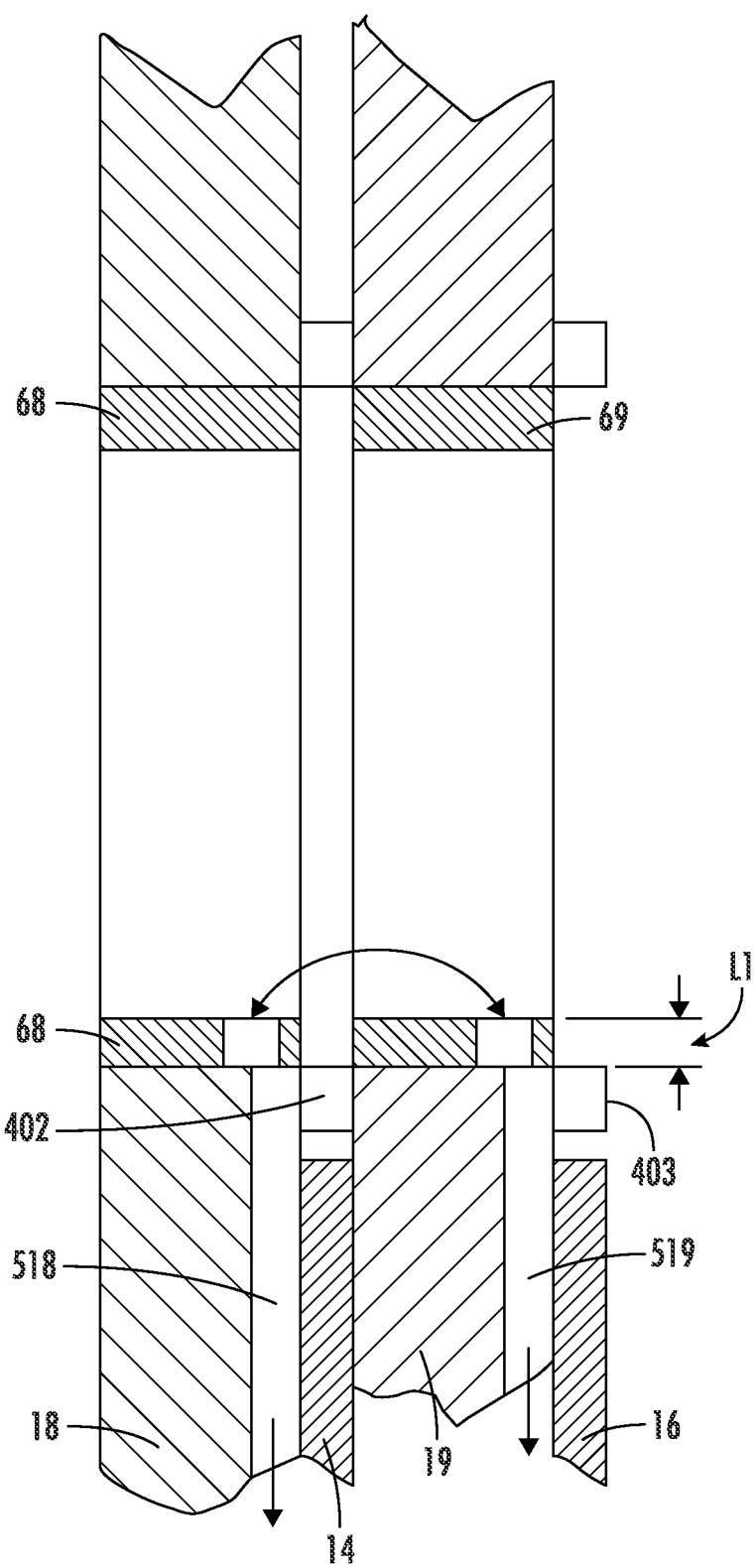
FIG. 9 illustrates a cross sectioned view of current leak streams between two consecutive polar plates in a stack with insulating pieces attached in accordance with specific embodiments of the invention disclosed herein.
Figure 10:
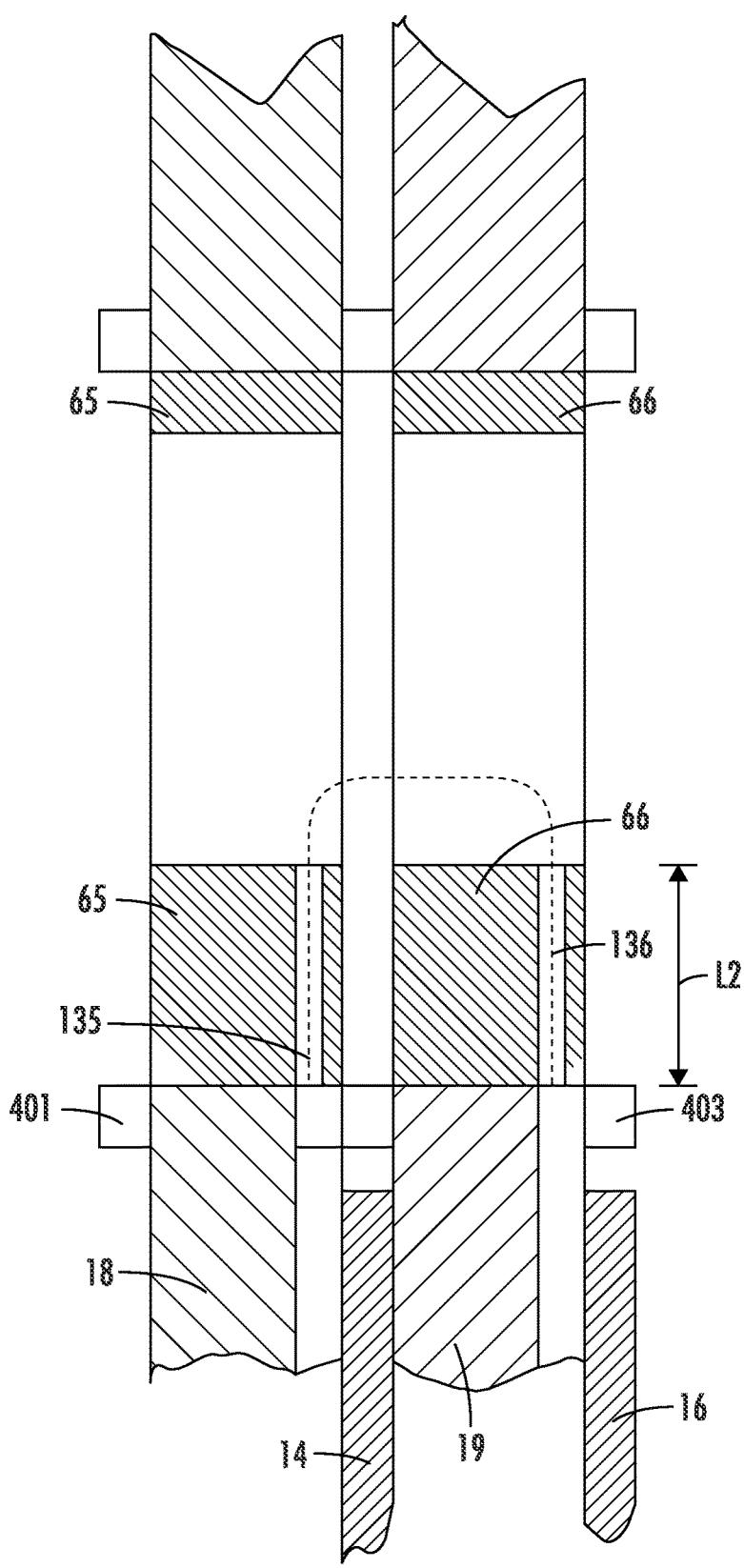
FIG. 10 illustrates a cross section view of current leak streams between two consecutive polar plates in a stack with insulating pieces having a longer length (L) than in the example of FIG. 9 in accordance with specific embodiments of the invention disclosed herein.

FIGS. 8, 9, and 10 illustrate leakage current streams between two consecutive polar plates according to several embodiments. FIG. 8 is in accordance with the related art and illustrates the current leak streams in an electrolyzer assembly with no insulating layer, for example with no insulating layer. FIG. 9 and FIG. 10 both illustrate the current leak streams in an electrolyzer assembly in accordance with specific embodiments of the present invention, comprising insulating layers in the form of insulating pieces positioned on the polar plates, for example, attached, glued, or clicked to the polar plates. According to FIG. 10, the insulating piece comprises channels with a length greater than the channels illustrated in FIG. 9.

FIGS. 8, 9, and 10 show cross sectional view of a pair of bipolar plates 18 and 19 assembled in a stack with MEAs 14 and 16. The assembly also comprises gaskets 401, 402, and 403, positioned between the polar plates 18 and 19 and the MEAs 14 and 16 (as otherwise illustrated in FIG. 11). These figures also show the inlet ports 98 and 99 on respectively polar plates 18 and 19, inlet ports through which is operated the supply of the electrically conductive electrolyte, the circulation of which is represented by thick arrows. Channels 518 and 519 (i.e., flow fields) in the polar plates 18 and 19 are also illustrated.

FIG. 9 depicts the insulating piece 68 positioned (e.g., attached, glued, or clicked) on bipolar plate 18 and the insulating piece 69 positioned (e.g., attached, glued, or clicked) on bipolar plate 19. FIG. 10 depicts the insulating piece 65 positioned (e.g., attached, glued, or clicked) on bipolar plate 18 and the insulating piece 66 positioned (e.g., attached, glued, or clicked) on bipolar plate 19.

As illustrated in FIG. 8, the circulation of electrically conductive fluids creates a potential electrical contact between adjacent and conductive polar plates 18 and 19. These contacts can lead to leakage currents, which are represented on these figures by the double-sided thin arrows. Specific embodiments of the present invention solve these issues. As illustrated in FIG. 9, insulating pieces 68 and 69 increase the distance through the circulating electrically conductive fluid between the adjacent conductive polar plates, thereby significantly reducing leakage currents or even preventing them.

It can be noted that insulating pieces 65 and 66 are distinct from insulating pieces 68 and 69 by the thickness of their walls (i.e., the length of their openings) in particular, the walls comprising the openings to connect the conduit to the flow fields in the electrolyzer assembly. In particular, the insulating pieces 65 and 66 comprise openings 135 and 136 on their walls. The length L1 of the opening (i.e., thickness L1 of the walls) of the insulating pieces 68 and 69 is smaller than the length L2 of the opening (i.e., thickness L2 of the walls) of the insulating pieces 65 and 66. In other words, L2>L1. In FIG. 10, the path for the parasitic currents is much longer than the path in FIG. 9, which overall reduces their general occurrences in the electrolyzer assembly. While both the insulating pieces illustrated in FIG. 9 and FIG. 10 solve the issue of leakage currents, FIG. 10 illustrates the idea that the design of the insulating piece can be adjusted to contribute to leakage currents reduction to an even greater extent.

FIG. 11 illustrates an electrolyzer assembly according to specific embodiments of the present invention. The electrolyzer assembly comprises two bipolar plates 604 and 606, and one MEA 610, wherein both the bipolar plates and the MEA comprise four apertures located in the periphery of these assembly components 604, 606, and 610. FIG. 11 also illustrates that the bipolar plates 604 and 606 comprise insulating pieces 614 and 616, located on certain of their apertures. The electrolyzer assembly also comprises gaskets 620, 622, 624, and 626 which are located between bipolar plate 604 and MEA 610, as well as between the MEA 610 and the bipolar plate 606, in the electrolyzer stack.

FIGS. 3A, 3B, and 3C illustrate kits of parts according to specific embodiments of the present invention, where the insulating pieces are not attached to the polar plates. FIG. 4 illustrates a kit of parts, where one insulating piece is attached to the polar plates.

In specific embodiments, the at least one insulating piece is positioned (e.g., attached, glued, or clicked) on the polar plate in the kit of parts. In specific embodiments, the at least one insulating piece is not positioned (e.g., not attached, not glued, or not clicked) on the polar plate in the kit of parts.

In specific embodiments, the kit of parts is such that the at least one opening of the insulating piece is configured to interface the flow fields of the polar plate.

In specific embodiments, the insulating piece is configured to reduce the surface of the polar plate exposed to the fluid (e.g., electrolyte and/or fluid) when the electrolyzer is in operation.

In specific embodiments, the kit of parts comprises bipolar plate(s) and/or monopolar plate(s).

In specific embodiments, the kit of parts comprises at least one gasket configured to seal the polar plate and the insulating piece. The kit of parts may comprise more than one gasket, for example, two, three, four, five, six, seven, eight, nine, or ten.

In specific embodiments, the insulating piece is in several parts and comprises an insert for distributing the fluid in the flow fluids or collecting the fluid from the flow fields.

In specific embodiments, the polar plate comprises at least one groove for inserting the insulating piece, the insert, and/or the gasket.

In specific embodiments, a method of operating an electrolyzer is provided. The method comprises supplying an electrically conductive fluid and current to the electrolyzer assembly; passing the electrolyte through the polar plate in order to operate a reduction reaction or an oxidation reaction; and removing the fluid from the electrolyzer. The method can also comprise the steps of: supplying an anodic input fluid, a cathodic input fluid, and current to the electrolyzer, wherein at least one of the cathodic or anodic input fluid is an electrically conductive electrolyte; passing the fluids through the polar plates in order to operate the reduction reaction at the cathodes and the oxidation reaction at the anodes; and removing the anodic output fluid and the cathodic output fluid from the electrolyzer.

In specific embodiments, the method is continuous, for example with a continuous feeding and withdrawing of the fluids, or automated.

In specific embodiments, the method is such that: the reduction reaction is the reduction of carbon dioxide; and the oxidation reaction is the oxidation of water, hydroxides, or bicarbonate species.

In specific embodiments, the method is such that: the reduction reaction is the reduction of water; and the oxidation reaction is the oxidation of water or hydroxides.

In specific embodiments, an electrolyzer assembly as described herein is used to convert carbon dioxide into carbon oxide.

In specific embodiments, an electrolyzer assembly as described herein is used to convert water into hydrogen. In embodiments in which the electrolyzer assembly described herein is utilized for water electrolysis, water can be supplied from an inlet to the input anodic conduit, and voltage can be applied from terminals located on the terminal plates through the power supply electrically connected to the terminals. Thus, in each of the unit cells, water is supplied from the input conduit to the flow fields of a first polar plate via the inlet port of the polar plate. The water is decomposed by electricity in the anodic compartment (e.g., catalyst layer) to produce hydrogen ions, electrons, and oxygen. That is, the following oxidation reaction is induced at the anode:

$$H_2O \rightarrow 2H^+ + 2e^- + \tfrac{1}{2}O_2 \quad \text{(oxidation reaction) (52)}$$

The hydrogen ions produced in the oxidation reaction pass through the ion-conducting interface (e.g., a membrane) toward the cathodic compartment (e.g., catalyst layer), and combine with electrons to produce dihydrogen. That is, the following reduction reaction is induced at the cathode:

$$2H^+ + 2e^- \rightarrow H_2 \quad \text{(reduction reaction) (53)}$$

Thus, the dihydrogen flows along the flow fields of the opposite bipolar plate. The hydrogen flows through the outlet port of the polar plate to the output conduit to the outside of the electrolyzer assembly. The oxygen produced in the reaction and the unreacted water flow through the flow fields of the first polar plate and are discharged to the outside through the discharge passage.

In specific embodiments, an insulating piece as described herein is used to prevent or reduce leakage currents when the electrolyzer is in operation.

While the specification has been described in detail with respect to specific embodiments of the invention, it will be appreciated that those skilled in the art, upon attaining an understanding of the foregoing, may readily conceive of alterations to, variations of, and equivalents to these embodiments. These modifications and variations to the present invention may be practiced by those skilled in the art, without departing from the scope of the present invention, which is more particularly set forth in the appended claims.

What is claimed is:

1. An electrolyzer assembly, comprising:
a stack of cells;
a plurality of polar plates in the stack of cells having a plurality of surfaces;
a plurality of flow fields formed on the plurality of surfaces of and located between the plurality of polar plates;
a plurality of membranes interleaved with the plurality of polar plates between the plurality of flow fields;
a conduit fluidly connecting flow fields in the plurality of flow fields;
an electrically conductive fluid in the conduit;
a plurality of insulating pieces arranged between a conductive surface of the plurality of flow fields and the conduit, wherein the plurality of insulating pieces are attached to a plurality of apertures in the plurality of polar plates;
a plurality of trench openings in the plurality of insulating pieces providing a plurality of fluid connections between the conduit and the plurality of flow fields.

2. The electrolyzer assembly of claim 1, wherein:
the conduit is at least partially formed by the plurality of apertures and the plurality of insulating pieces.

3. The electrolyzer assembly of claim 2, wherein:
the plurality of trench openings have a length of at least 1000 microns.

4. The electrolyzer assembly of claim 1, wherein:
the plurality of trench openings each have a trench cross section (S) and a trench length (L) where L is greater than 1 centimeter and S is less than 1 centimeter.

5. The electrolyzer assembly of claim 1, wherein the plurality of insulating pieces are made of at least one polymer from the following group:
acrylonitrile butadiene styrene (ABS), polytetrafluoroethylene (PTFE), polypropylene (PP), polyethylene (PE), polyolefins, polyvinyl chloride (PVC), polyamide (PA, nylon), polyvinylidene difluoride (PVDF), polyaryletherketones (PAEK, including PEEK), polyethylene terephthalate (PET), perfluoroalkoxy (PFA), polycarbonate (PC), polystyrene, polysulfones, polyurethane, polyarylene sulfide (PAS, including PPS), polyetherimide (PEI), and polyimide (PI).

6. The electrolyzer assembly of claim 1, wherein the plurality of insulating pieces:
are shaped to reduce a surface of the plurality of polar plates exposed to the electrically conductive fluid.

7. The electrolyzer assembly of claim 1, further comprising:
a plurality of grooves in the plurality of polar plates; and
a plurality of inserts in the plurality of grooves, that fluidly connect the plurality of trench openings to the plurality of flow fields.

8. The electrolyzer assembly of claim 1, wherein:
the electrically conductive fluid is a cathodic input fluid for the stack of cells.

9. The electrolyzer assembly of claim 1, wherein:
the electrically conductive fluid is an electrically conductive anolyte.

10. The electrolyzer assembly of claim 1, wherein the plurality of flow fields have at least one configuration from the following group:
a ladder configuration, a single channel serpentine configuration, a multi-channel serpentine configuration; an interdigitated configuration; a pillar configuration; a bio-inspired configuration; and a leaf-like configuration.

11. The electrolyzer assembly of claim 1, wherein:
the conduit is at least partially formed by the plurality of apertures.

12. A kit of parts for an electrolyzer assembly cell comprising:
a polar plate having at least one flow field formed on a surface of the polar plate and positioned to be fluidly connected to a conduit when the electrolyzer assembly cell is in an electrolyzer assembly; and
at least one insulating piece shaped to be arranged between a conductive surface of the at least one flow field and the conduit when the electrolyzer assembly cell is in the electrolyzer assembly, wherein the at least one insulating piece includes a trench opening;
wherein the trench opening is fluidly connected to the at least one flow field when the at least one insulating piece is arranged between the conductive surface of the at least one flow field and the conduit.

13. The kit of parts of claim 12, further comprising:
an aperture in the polar plate;
wherein the at least one insulating piece is shaped to be attached to the aperture in the polar plate.

14. The kit of parts from claim 13, wherein the trench opening has a length of at least 1000 microns.

15. The kit of parts of claim 14, further comprising:
a groove in the polar plate; and
an insert shaped to be inserted into the groove and to fluidly connect the trench opening to the at least one flow field when the insert is inserted into the groove.

16. The kit of parts of claim 13, wherein the trench opening has a trench cross section (S) and a trench length (L), where S is less than 1 centimeter and L is greater than 1 centimeter.

17. The kit of parts of claim 13, wherein the at least one insulating piece is made of at least one polymer from the following group:
acrylonitrile butadiene styrene (ABS), polytetrafluoroethylene (PTFE), polypropylene (PP), polyethylene (PE), polyolefins, polyvinyl chloride (PVC), polyamide (PA, nylon), polyvinylidene difluoride (PVDF), polyaryletherketones (PAEK, including PEEK), polyethylene terephthalate (PET), perfluoroalkoxy (PFA), polycarbonate (PC), polystyrene, polysulfones, polyurethane, polyarylene sulfide (PAS, including PPS), polyetherimide (PEI), and polyimide (PI).

18. The kit of parts from claim 12, wherein:
the polar plate is configured to apply potential between a cathode and anode; and
the at least one flow field is for a cathodic input fluid.

19. The kit of parts from claim 12, wherein the at least one insulating piece
is shaped to reduce a surface of the polar plate exposed to an electrically conductive fluid in the conduit when the electrolyzer assembly cell is in the electrolyzer assembly.

20. The kit of parts from claim 12, wherein the at least one flow field has at least one configuration from the following group:
a ladder configuration, a single channel serpentine configuration, a multi-channel serpentine configuration; an interdigitated configuration; a pillar configuration; a bio-inspired configuration; and a leaf-like configuration.

21. The kit of parts from claim 12, further comprising:
an aperture in the polar plate; and
wherein the conduit is partially formed by the aperture when the electrolyzer assembly cell is in the electrolyzer assembly.

22. An electrolyzer assembly cell comprising:
a first active face of a first bipolar plate;
a first flow field on the first active face;
a cathodic input fluid in the first flow field;
a cathode to perform a reduction reaction of a reactant of the cathodic input fluid;
a second active face of a second bipolar plate;
a second flow field on the second active face;
an anodic input fluid in the second flow field;
an anode to perform an oxidation reaction of a reactant of the anodic input fluid;
a first set of at least two conduits fluidly connected to the first flow field and shaped to supply the cathodic input fluid to the first flow field;
a second set of at least two conduits fluidly connected to the second flow field and shaped to supply the anodic input fluid to the second flow field;
at least two insulating layers arranged between at least two conductive surfaces of the first flow field and the first set of at least two conduits;
at least two insulating layers arranged between at least two conductive surfaces of the second flow field and the second set of at least two conduits; and
wherein: at least one of the anodic input fluid and the cathodic input fluid is electrically conductive;
an insulating layer in the at least two insulating layers arranged between the at least two conductive surfaces of the first flow field and the first set of at least two conduits is formed by a first insulating coating on the first bipolar plate;
an insulating layer in the at least two insulating layers arranged between the at least two conductive surfaces of the second flow field and the second set of at least two conduits is formed by a second insulating coating on the second bipolar plate;
the first insulating coating covers at least 1000 microns of a first edge of the first bipolar plate; and
the second insulating coating covers at least 1000 microns of a second edge of the second bipolar plate.

\* \* \* \* \*